United States Patent
Fujiwara et al.

(10) Patent No.: US 10,463,966 B2
(45) Date of Patent: Nov. 5, 2019

(54) GAME DEVICE, PROCESSING METHOD, AND INFORMATION STORAGE MEDIUM

(71) Applicant: BANDAI NAMCO Entertainment Inc., Tokyo (JP)

(72) Inventors: Yasunori Fujiwara, Tokyo (JP); Tatsuya Takeda, Tokyo (JP); Gota Goto, Tokyo (JP); Shinichirou Fukunishi, Tokyo (JP); Satoshi Tagiri, Yokohama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 313 days.

(21) Appl. No.: 15/456,916

(22) Filed: Mar. 13, 2017

(65) Prior Publication Data
US 2017/0266557 A1    Sep. 21, 2017

(30) Foreign Application Priority Data
Mar. 16, 2016    (JP) .................................. 2016-052909

(51) Int. Cl.
*A63F 13/58*    (2014.01)
*A63F 13/537*    (2014.01)
(Continued)

(52) U.S. Cl.
CPC ............ *A63F 13/58* (2014.09); *A63F 13/537* (2014.09); *A63F 13/56* (2014.09); *A63F 13/822* (2014.09); *A63F 13/825* (2014.09)

(58) Field of Classification Search
CPC ........ A63F 13/58; A63F 13/537; A63F 13/56; A63F 13/822; A63F 13/825
See application file for complete search history.

(56) References Cited

U.S. PATENT DOCUMENTS

| 6,171,189 B1 | 1/2001 | Katano et al. |
| 2005/0181849 A1* | 8/2005 | Kobayashi ............... A63F 13/10 463/7 |

(Continued)

FOREIGN PATENT DOCUMENTS

| JP | 2004-033689 A | 2/2004 |
| JP | 2006-068536 A | 3/2006 |

OTHER PUBLICATIONS

Tanaka, Hiroshi, Shin Megami Tensei Imagine Devil Buster Bible, First edition, ASCII Media Works, Inc., Kiyoshi Takano, Mar. 27, 2010, pp. 22-26 (and a partial English translation thereof).

(Continued)

*Primary Examiner* — Corbett B Coburn
(74) *Attorney, Agent, or Firm* — Posz Law Group, PLC

(57) ABSTRACT

A game device includes a processor implementing a character process that performs a character control process; a game process that performs a game parameter calculation process; and a display process that displays a game image based on results of the game process. The processor implements the character process that performs a process that controls a master character that is operated by a player, and a process that controls a plurality of subordinate characters that are subordinate to the master character. The processor implements the game process that performs a process regarding a game event that involves a first subordinate character and a second subordinate character based on a first relationship parameter between the first subordinate character and the second subordinate character, a second relationship parameter between the master character and the first subordinate character, and a third relationship parameter between the master character and the second subordinate character.

20 Claims, 18 Drawing Sheets

US 10,463,966 B2

Page 2

(51) Int. Cl.
*A63F 13/822* (2014.01)
*A63F 13/825* (2014.01)
*A63F 13/56* (2014.01)

(56) References Cited

U.S. PATENT DOCUMENTS

| | | | | |
|---|---|---|---|---|
| 2007/0218992 A1* | 9/2007 | Maehiro | ............... | A63F 13/00 463/31 |
| 2009/0241038 A1* | 9/2009 | Izuno | ............... | A63F 13/426 715/757 |
| 2013/0072300 A1* | 3/2013 | Kishimoto | ............... | A63F 13/47 463/32 |
| 2013/0196728 A1* | 8/2013 | Yasue | ............... | A63F 13/12 463/8 |
| 2013/0260866 A1* | 10/2013 | Inubushi | ............... | G06F 13/00 463/24 |
| 2018/0001189 A1* | 1/2018 | Tang | ............... | A63F 13/2145 |

OTHER PUBLICATIONS

Arcrise Fantasia, Dengeki DS&Wii, vol. 9, No. 15, ASCII Media Works, Aug. 1, 2009, pp. 116-119.

* cited by examiner

FIG. 6
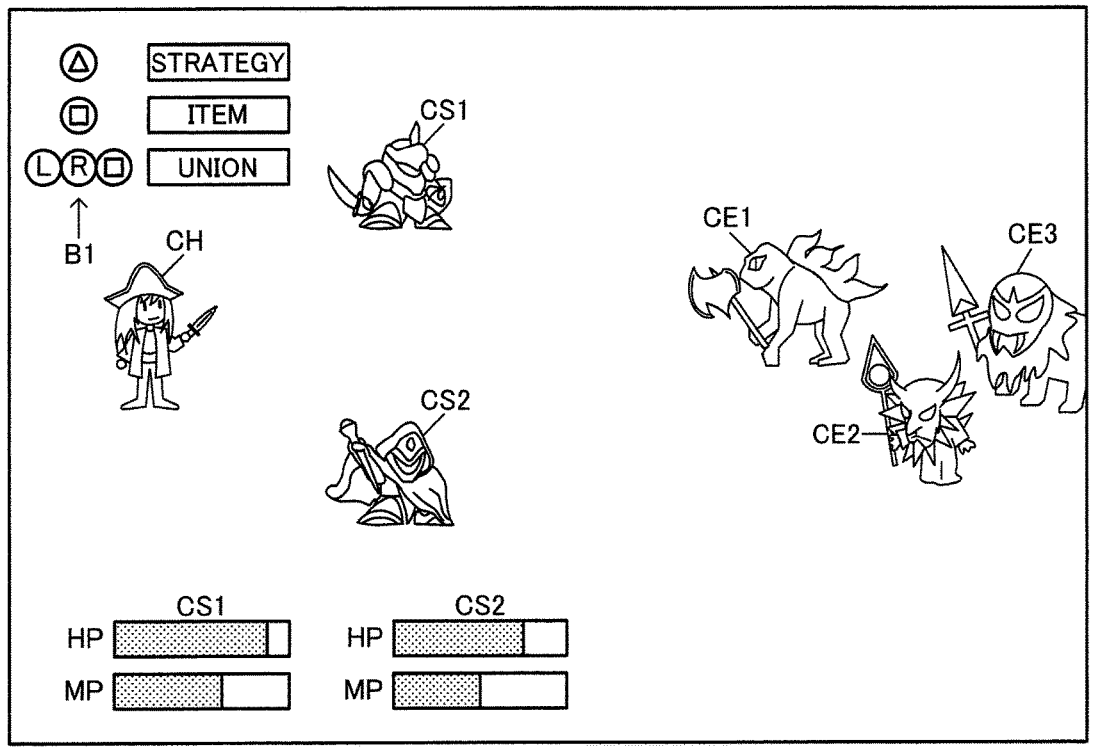
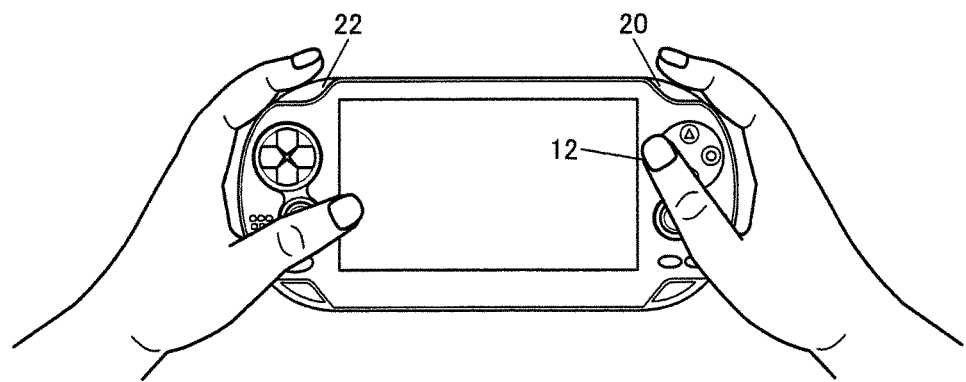

FIG. 14A MASTER CHARACTER

| ATTRIBUTE | LEVEL | TRAINER ABILITY | TRAINER POINTS | GAME POINTS | SKILL | OWNED CHARACTER | OWNED ITEM |
|---|---|---|---|---|---|---|---|
| ATA | LVA | TRA | PTR | PGM | SK1,SK2··· | CS1,CS2··· | I1,I2,I3··· |
| | | | | | | | --- |

FIG. 14B SUBORDINATE CHARACTER

| ATTRIBUTE | ATTACK CAPABILITY | DEFENSE CAPABILITY | SPEED | WISDOM | BOND | NORMAL TECHNIQUE | SPECIAL TECHNIQUE |
|---|---|---|---|---|---|---|---|
| ATB | OFB | DFB | SPB | CLB | ETB | TB1,TB2··· | SB1,SB2··· |
| | | | | | | | --- |

FIG. 14C UNITED CHARACTER

| ATTRIBUTE | ATTACK CAPABILITY | DEFENSE CAPABILITY | SPEED | WISDOM | BOND | NORMAL TECHNIQUE | SPECIAL TECHNIQUE |
|---|---|---|---|---|---|---|---|
| ATC | OFC | DFC | SPC | CLC | ETC | TC1,TC2··· | SC1,SC2··· |
| | | | | | | | --- |

FIG. 14D RELATIONSHIP PARAMETER

| CS1⇔CS2 | CH⇔CS1 | CH⇔CS2 |
|---|---|---|
| PR1 | PR2 | PR3 |

GAME DEVICE, PROCESSING METHOD, AND INFORMATION STORAGE MEDIUM

Japanese Patent Application No. 2016-052909 filed on Mar. 16, 2016, is hereby incorporated by reference in its entirety.

BACKGROUND

The present invention relates to a game device, a processing method, an information storage medium, and the like.

A game device is known that allows the player to play a game in which a character that is operated by the player or controlled by a computer appears. A game device is also known that unites a plurality of characters that appears in the game when a predetermined condition has been satisfied to generate a united character. For example, JP-A-2006-68536 discloses technology that relates to such a game device.

According to the technology disclosed in JP-A-2006-68536, when it has been determined that the display position of a first character and the display position of a second character have coincided with each other when the game is executed according to a game program, a union event due to a generation change is generated, and the first character and the second character are united to generate a new character.

According to the technology disclosed in JP-A-2006-68536, however, only the relationship (e.g., whether or not the display positions have coincided with each other) between the first character and the second character is taken into consideration during a determination process regarding generation of a game event (e.g., union event). Therefore, generation of the game event and the result thereof lack interest and depth.

SUMMARY

According to one aspect of the invention, there is provided a game device comprising:

a processor comprising hardware, the processor being configured to implement:

a character process that performs a character control process;

a game process that performs a game parameter calculation process; and a display process that displays a game image based on results of the game process, wherein the processor implements the character process that performs a process that controls a master character that is operated by a player, and a process that controls a plurality of subordinate characters that are subordinate to the master character and include a first subordinate character and a second subordinate character, and the processor implements the game process that performs a process regarding a game event that involves the first subordinate character and the second subordinate character based on a first relationship parameter between the first subordinate character and the second subordinate character, a second relationship parameter between the master character and the first subordinate character, and a third relationship parameter between the master character and the second subordinate character.

According to another aspect of the invention, there is provided a processing method comprising:

performing a character process that performs a character control process;

performing a game process that performs a game parameter calculation process;

performing a display process that displays a game image based on results of the game process;

performing the character process that performs a process that controls a master character that is operated by a player, and a process that controls a plurality of subordinate characters that are subordinate to the master character and include a first subordinate character and a second subordinate character; and performing the game process that performs a process regarding a game event that involves the first subordinate character and the second subordinate character based on a first relationship parameter between the first subordinate character and the second subordinate character, a second relationship parameter between the master character and the first subordinate character, and a third relationship parameter between the master character and the second subordinate character.

According to another aspect of the invention, there is provided a computer-readable information storage medium storing a program that causes a computer to execute the above processing method.

BRIEF DESCRIPTION OF THE DRAWINGS

FIG. 6 is a view illustrating a determination method regarding generation of a union event based on operation information about a player.

FIGS. 14A to 14D are views illustrating an example of game parameters and the like of a master character, a subordinate character, and a united character, and relationship parameters.

DESCRIPTION OF EXEMPLARY EMBODIMENTS

Figure 1:
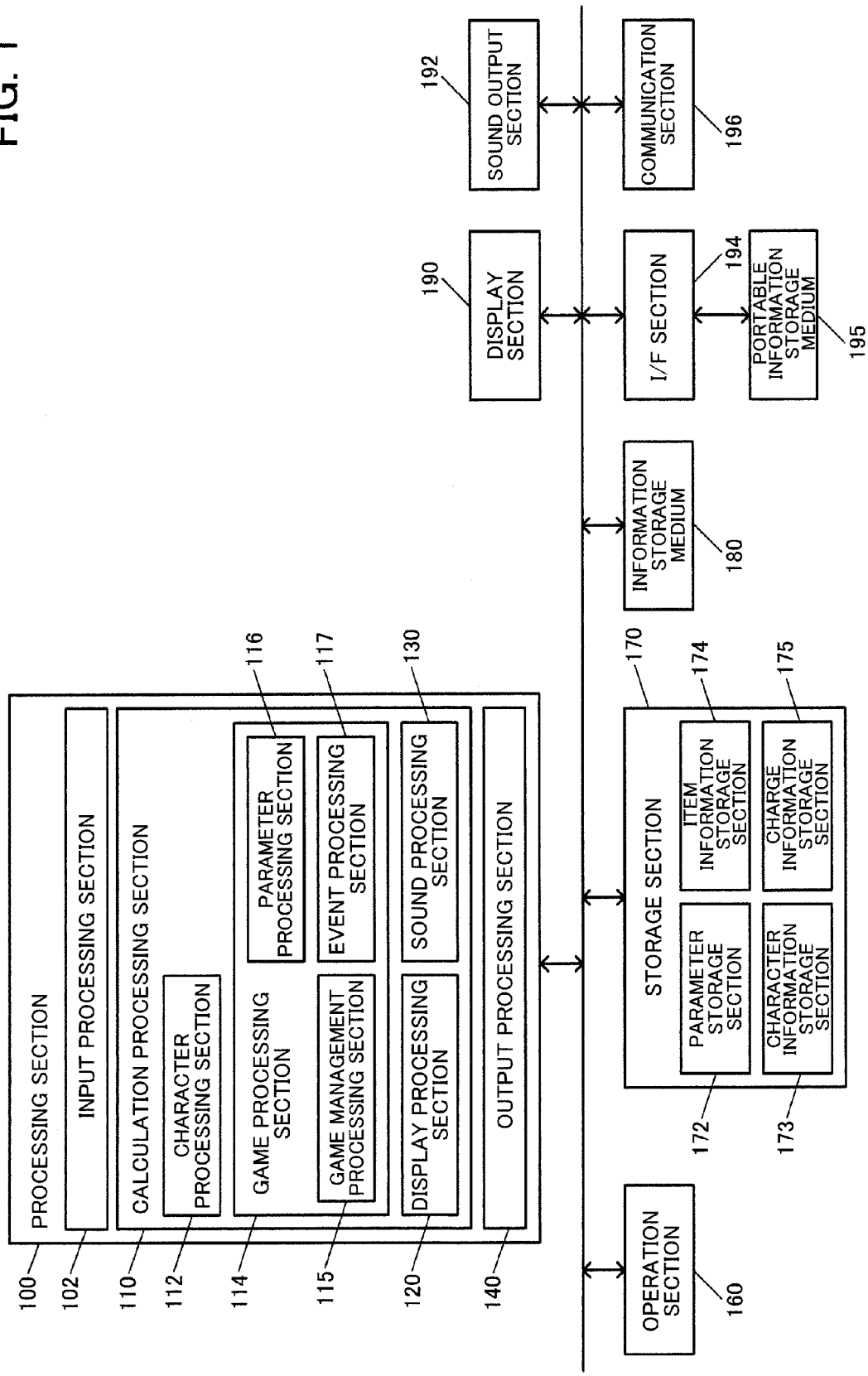
FIG. 1 illustrates a configuration example of a game device according to one embodiment of the invention.

Several aspects of the invention may provide a game device, a processing method, an information storage medium, and the like that can implement a process regarding a game event that reflects the relationship between the subordinate characters, and the relationship between the master character and the subordinate characters.

According to one embodiment of the invention, there is provided a game device comprising:

a processor comprising hardware, the processor being configured to implement:

a character process that performs a character control process;

a game process that performs a game parameter calculation process; and a display process that displays a game image based on results of the game process, wherein the processor implements the character process that performs a process that controls a master character that is operated by a player, and a process that controls a plurality of subordinate characters that are subordinate to the master character and include a first subordinate character and a second subordinate character, and the processor implements the game process that performs a process regarding a game event that involves the first subordinate character and the second subordinate character based on a first relationship parameter between the first subordinate character and the second subordinate character, a second relationship parameter between the master character and the first subordinate character, and a third relationship parameter between the master character and the second subordinate character.

According to one embodiment of the invention, the process that controls the master character that is operated by the player, and the process that controls the first subordinate character and the second subordinate character that are subordinate to the master character, are performed. The process regarding the game event that involves the first subordinate character and the second subordinate character is performed based on the first relationship parameter between the first subordinate character and the second subordinate character, the second relationship parameter between the master character and the first subordinate character, and the third relationship parameter between the master character and the second subordinate character. For example, a determination process regarding generation of the game event, a post-game event game parameter setting process, and the like are performed. For example, the process regarding the game event that involves the first subordinate character and the second subordinate character is normally performed using the first relationship parameter between the first subordinate character and the second subordinate character. According to one aspect of the invention, however, the process regarding the game event that involves the first subordinate character and the second subordinate character is performed based on the first relationship parameter between the first subordinate character and the second subordinate character, the second relationship parameter between the master character and the first subordinate character, and the third relationship parameter between the master character and the second subordinate character. This makes it possible to implement a process regarding a game event that reflects the relationship between the subordinate characters, and the relationship between the master character and the subordinate characters.

In the game device, the processor may implement the game process that performs the process regarding the game event based on the first relationship parameter, the second relationship parameter, the third relationship parameter, and at least one of operation information about the player, state information about the first subordinate character and the second subordinate character, and situation information about a game.

This makes it possible to implement the process regarding the game event based on the first relationship parameter, the second relationship parameter, and the third relationship parameter using the operation information about the player, the state information about the first subordinate character and the second subordinate character, the situation information about the game, and the like as the determination conditions.

In the game device, the processor may implement the game process that sets generation probability information about the game event based on values of the first relationship parameter, the second relationship parameter, and the third relationship parameter.

This makes it possible to implement the process regarding the game event (e.g., determination process regarding generation of the game event) based on the probability information that has been set based on the values of the first relationship parameter, the second relationship parameter, and the third relationship parameter.

In the game device, the processor may implement the game process that performs a determination process regarding generation of a union event, the union event being the game event in which the first subordinate character and the second subordinate character are united to form a united character.

This makes it possible to implement the union event in which the first subordinate character and the second subordinate character are united, while also reflecting the relationship between the master character and the first subordinate character and the relationship between the master character and the second subordinate character.

In the game device, the processor may implement the game process that sets at least one of a game parameter of the united character and a union duration based on the first relationship parameter, the second relationship parameter, and the third relationship parameter.

This makes it possible to set the game parameter of the united character and the union duration based on the first relationship parameter, the second relationship parameter, and the third relationship parameter when the union event has been generated.

In the game device, the processor may implement the game process that performs a determination process regarding generation of a special motion event, the special motion event being the game event in which the first subordinate character and the second subordinate character make a special motion.

This makes it possible to implement the special motion event that involves the first subordinate character and the second subordinate character while also reflecting the relationship between the master character and the first subordinate character and the relationship between the master character and the second subordinate character.

In the game device, the processor may implement the game process that sets a game parameter of the special motion based on the first relationship parameter, the second relationship parameter, and the third relationship parameter.

This makes it possible to set the game parameter of the special motion based on the first relationship parameter, the second relationship parameter, and the third relationship parameter when the special motion event has been generated.

In the game device, the first subordinate character and the second subordinate character may be computer-controlled non-player characters.

This makes it possible to use a computer-controlled non-player character as the first subordinate character and the second subordinate character that are subordinate to the master character, and implement the process regarding the game event that reflects the second relationship parameter and the third relationship parameter between the non-player character and the master character.

In the game device, the processor may implement the character process that controls the first subordinate character and the second subordinate character so as to act based on an instruction from the master character that is operated by the player.

This makes it possible to cause the first subordinate character and the second subordinate character to act based on instructions from the master character that is operated by the player. This makes it possible to implement the process regarding the game event that reflects the second relationship parameter between the first subordinate character that acts based on instructions from the master character and the master character, and the third relationship parameter between the second subordinate character that acts based on instructions from the master character and the master character.

In the game device, the processor may implement the game process that changes the second relationship parameter and the third relationship parameter based on at least one of details of the game process performed on the master character, elapsed time information about a game, attribute information about the master character, the first subordinate character, and the second subordinate character, charge information about the player, used item information about the player, and game parameters of the master character, the first subordinate character, and the second subordinate character.

This makes it possible to implement the process regarding the game event using the second relationship parameter and the third relationship parameter that change based on the details of the game process, the elapsed time information, the attribute information, the charge information, the used item information, or the game parameter of the character.

In the game device, the processor may implement the game process that changes the first relationship parameter based on at least one of identical event participation information about the first subordinate character and the second subordinate character, elapsed time information about a game, attribute information about the first subordinate character and the second subordinate character, charge information about the player, used item information about the player, and game parameters of the master character, the first subordinate character, and the second subordinate character.

This makes it possible to implement the process regarding the game event using the first relationship parameter that changes based on the identical event participation information, the elapsed time information, the attribute information, the charge information, the used item information, or the game parameter of the character.

According to another embodiment of the invention, there is provided a processing method comprising:

performing a character process that performs a character control process;

performing a game process that performs a game parameter calculation process;

performing a display process that displays a game image based on results of the game process;

performing the character process that performs a process that controls a master character that is operated by a player, and a process that controls a plurality of subordinate characters that are subordinate to the master character and include a first subordinate character and a second subordinate character; and performing the game process that performs a process regarding a game event that involves the first subordinate character and the second subordinate character based on a first relationship parameter between the first subordinate character and the second subordinate character, a second relationship parameter between the master character and the first subordinate character, and a third relationship parameter between the master character and the second subordinate character.

The exemplary embodiments of the invention are described below. Note that the following exemplary embodiments do not in any way limit the scope of the invention laid out in the claims. Note also that all of the elements described below in connection with the exemplary embodiments should not necessarily be taken as essential elements of the invention.

1. Configuration

FIG. 1 is an exemplary block diagram illustrating a game device (image generation device, server system, or game system) according to one embodiment of the invention. The game device includes a processing section 100, an operation section 160, a storage section 170, a display section 190, a sound output section 192, an interface (I/F) section 194, and a communication section 196. Note that the configuration of the game device according to one embodiment of the invention is not limited to the configuration illustrated in FIG. 1. Various modifications and variations may be made, such as omitting some of the elements (sections) illustrated in FIG. 1, or providing an additional element.

The processing section 100 performs various processes (e.g., input process, calculation process, and output process) based on operation information output from the operation section 160, a program, and the like.

Each process (function) according to one embodiment of the invention that is performed (implemented) by each section of the processing section 100 may be implemented by a processor (i.e., a processor including hardware). For example, each process according to one embodiment of the invention may be implemented by a processor that operates based on information (e.g., program), and a memory that stores information (e.g., program). The processor may implement the function of each section by individual hardware, or may implement the function of each section by integrated hardware, for example. For example, the processor may include hardware, and the hardware may include at least one of a circuit that processes a digital signal and a circuit that processes an analog signal. For example, the processor may include one or more circuit devices (e.g., IC), and one or more circuit elements (e.g., resistor or capacitor) that are mounted on a circuit board. The processor may be a central processing unit (CPU), for example. Note that the processor is not limited to a CPU. Various other processors such as a graphics processing unit (GPU) or a digital signal processor (DSP) may also be used. The processor may be a hardware circuit that includes an ASIC. The processor may include an amplifier circuit, a filter circuit, and the like that process an analog signal. The memory (storage section 170) may be a semiconductor memory (e.g., SRAM or DRAM), or may be a register. The memory may be a magnetic storage device such as a hard disk drive (HDD), or may be an optical storage device such as an optical disk device. For example, the memory stores a computer-readable instruction, and the process (function) of each section of the processing section 100 is implemented by causing the processor to execute the instruction. The instruction may be an instruction set that is included in a program, or may be an instruction that instructs the hardware circuit included in the processor to operate.

The processing section 100 includes an input processing section 102, a calculation processing section 110, and an output processing section 140. The input processing section 102 performs an information input process. For example, the input processing section 102 performs a process (i.e., input process) that receives operation information input by the player using the operation section 160. For example, the input processing section 102 performs a process that acquires the operation information detected by the operation section 160. The input processing section 102 also performs a process (i.e., input process) that reads information from the storage section 170. For example, the input processing section 102 performs a process that reads information designated by a readout command from the storage section 170. The input processing section 102 also performs a process (i.e., input process) that receives information through the communication section 196. For example, the input processing section 102 performs a process (reception process) that receives information from an external device (e.g., another game device or server system) that is provided outside the game device through a network. The reception process includes a process that instructs the communication section 196 to receive information, a process that acquires information received by the communication section 196, and writes the acquired information into the storage section 170, and the like.

The calculation processing section 110 performs various calculation processes. For example, the calculation processing section 110 performs calculation processes such as a character process, a game process, a display process, and a sound process. The calculation processing section 110 includes a character processing section 112, a game processing section 114, a display processing section 120, and a sound processing section 130.

The character processing section 112 (i.e., a program module that implements a character process) performs a character process. For example, the character processing section 112 performs a process (i.e., character control process) that moves a character (i.e., a display object that appears in the game) in a game space (object space or virtual three-dimensional space), and a process (i.e., character control process) that causes the character to make a motion. For example, the character processing section 112 performs a control process that causes the character (model object) to move or make a motion (animation) in the game space (object space) based on the operation information input by the player using the operation section 160, a program (movement-motion algorithm), data (motion data), and the like. More specifically, the character processing section 112 performs a simulation process that sequentially calculates movement information (position, rotational angle, speed, or acceleration) and motion information (position or rotational angle of a part object) about the character every frame (e.g., 1/60th of a second). Note that the term "frame" used herein refers to a time unit used when the character movement-motion process (simulation process) or the image generation process is performed.

The game processing section 114 (i.e., a program module that implements a game process) performs a game process such as a game management process, a parameter process, an event process, and a game result calculation process. The game management process includes a process that starts the game when a game start condition has been satisfied, a process that proceeds with the game, a process that terminates the game when a game termination condition has been satisfied, and the like. The game management process is performed by the game management processing section 115. The parameter process is a game parameter calculation process. The game parameter is a parameter that is used for the game process. The parameter process is performed by a parameter processing section 116. The event process includes a process that determines whether or not a game event has occurred, and various processes that are performed when a game event has occurred. The event process is performed by an event processing section 117. The game result calculation process is a process that calculates the result achieved by the player during the game. For example, the game result calculation process includes a process that calculates the points and the score that are acquired by the player during the game, and a process that calculates the outcome (e.g., in-game money, token, or ticket) of the game.

The display processing section 120 (i.e., a program module that implements a display process) performs a process that displays a game image. For example, the display processing section 120 performs a drawing process based on the results of various processes (game process and simulation process) performed by the processing section 100 to generate an image, and displays the generated image on the display section 190. More specifically, the display processing section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or α-value) based on the results of the geometric process. The display processing section 120 draws the object (one or more primitive surfaces) subjected to perspective transformation in a drawing buffer (i.e., a buffer (e.g., frame buffer or work buffer) that can store image information on a pixel basis) included in the storage section 170 based on the drawing data (primitive surface data). The display processing section 120 thus generates an image viewed from a virtual camera (i.e., given viewpoint (e.g., a first viewpoint that corresponds to the left eye, and a second viewpoint that corresponds to the right eye)) in the object space. The drawing process performed by the display processing section 120 may be implemented by a vertex shader process, a pixel shader process, and the like.

The sound processing section 130 (i.e., a program module that implements a sound process) performs a sound process based on the results of various processes performed by the processing section 100. More specifically, the sound processing section 130 generates a game sound (e.g., musical composition (music and background music (BGM)), effect sound, or voice), and outputs the generated game sound to the sound output section 192.

The output processing section 140 performs an information output process. For example, the output processing section 140 performs a process (i.e., output process) that writes information into the storage section 170. For example, the output processing section 140 performs a process that writes information designated by a write command into the storage section 170. The output processing section 140 also performs a process (i.e., output process) that outputs information about the generated image to the display section 190, and a process (i.e., output process) that outputs information about the generated sound to the sound output section 192. The output processing section 140 also performs a process (i.e., output process) that transmits information through the communication section 196. For example, the output processing section 140 performs a process (transmission process) that transmits information to an external device (e.g., another game device or server system) that is provided outside the game device through a network. The transmission process includes a process that instructs the communication section 196 to transmit information, a process that instructs the communication section 196 with regard to the transmission target information, and the like.

The operation section 160 (operation device) allows the player (user) to input the operation information. The function of the operation section 160 may be implemented by a direction key, an operation button, an analog stick, a lever, a sensor (e.g., angular speed sensor or acceleration sensor), a microphone, a touch panel display, or the like.

The storage section 170 (memory) serves as a work area for the processing section 100, the communication section 196, and the like. The function of the storage section 170 may be implemented by a RAM, an SSD, an HDD, or the like. A game program and game data necessary for executing the game program are stored in the storage section 170. The storage section 170 includes a parameter storage section 172, a character information storage section 173, an item information storage section 174, and a charge information storage section 175.

The parameter storage section 172 stores information about various game parameters that are used for the game process. For example, the parameter storage section 172 stores information about game parameters of a master character, a subordinate character, and a united character, a first relationship parameter, a second relationship parameter, a third relationship parameter, a game parameter of the special motion, and the like.

The character information storage section 173 stores various types of information about a character that appears in the game. For example, the character information storage section 173 stores image information and shape information about the master character, the subordinate character, and the united character, action algorithm information about the subordinate character and the united character, information about a character that is owned (stocked) by the player, and the like.

The item information storage section 174 stores various types of information about an item that is owned by the player. For example, the item information storage section 174 stores image information, parameter information, and the like about an item. For example, when the player has acquired an item by means of an item acquisition event, charge, or the like, the item is registered in the item information storage section 174 as an item that is owned by the player.

The charge information storage section 175 stores charge information about the player. For example, the processing section 100 performs a charge process (e.g., charge determination process, charge data generation process, and charge data storage process) on the player. The charge information storage section 175 stores charge information that is subjected to the charge process. For example, personal information (e.g., name, sex, date of birth, and e-mail address) about the player is stored in the storage section 170 as user information. For example, account information about the player is also stored as the user information. The charge information stored in the charge information storage section 175 is linked to the account information about each player.

An information storage medium 180 (computer-readable medium) stores a program, data, etc. The function of the information storage medium 180 may be implemented by an optical disk (DVD or CD), a hard disk drive (HDD), a memory (e.g., ROM), or the like. The processing section 100 performs various processes according to one embodiment of the invention based on a program (data) stored in the information storage medium 180. A program that causes a computer (i.e., a device that includes an operation section, a processing section, a storage section, and an output section) to function as each section according to one embodiment of the invention (i.e., a program that causes a computer to execute the process of each section) may be stored in the information storage medium 180.

The display section 190 outputs (displays) an image generated according to one embodiment of the invention. The function of the display section 190 may be implemented by an LCD, an organic EL display, a CRT, an HMD, or the like. The sound output section 192 outputs a sound generated according to one embodiment of the invention. The function of the sound output section 192 may be implemented by a speaker, a headphone, or the like.

The I/F section 194 performs an interface process that interfaces with a portable information storage medium 195. The function of the I/F section 194 may be implemented by an I/F processing ASIC or the like. The portable information storage medium 195 allows the user to store various types of information. The portable information storage medium 195 is a storage device that can hold the information even when the supply of power has been stopped. The portable information storage medium 195 may be implemented by an IC card (memory card), a USB memory, a magnetic card, or the like.

The communication section 196 communicates with an external device (e.g., another game device or server system) through a network. The function of the communication section 196 may be implemented by hardware (e.g., communication ASIC or communication processor), or communication firmware.

A program (data) that causes a computer to function as each section according to one embodiment of the invention may be distributed to the information storage medium 180 (or the storage section 170) from an information storage medium included in a server system (host device) through a network and the communication section 196. Use of the information storage medium included in the server system is also intended to be included within the scope of the invention.

Figure 2A:
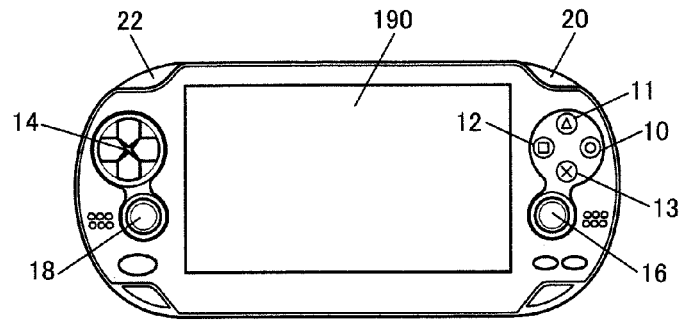
FIGS. 2A to 2E illustrate an example of a device that implements a game device according to one embodiment of the invention.
Figure 2B:
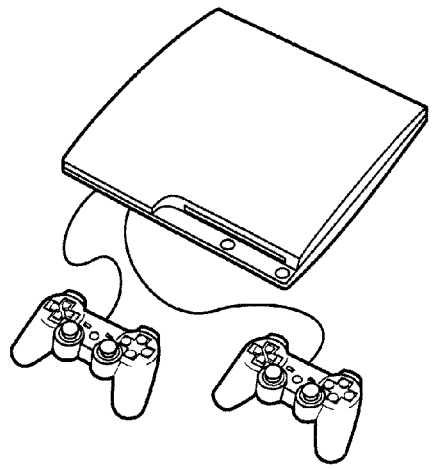
Figure 2C:
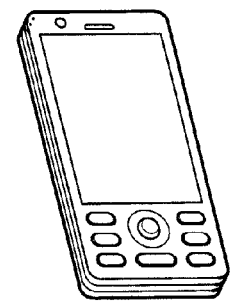
Figure 2D:
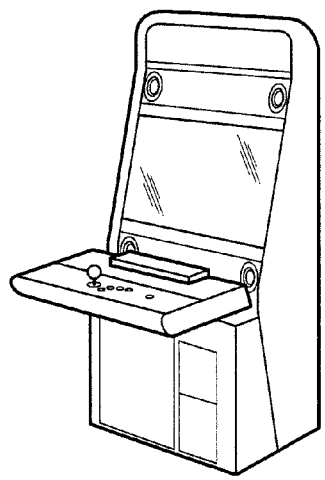
Figure 2E:
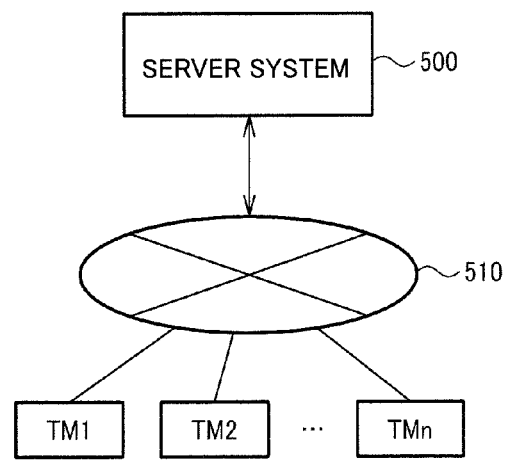

FIG. 2A illustrates an example of a device that implements the game device according to one embodiment of the invention. FIG. 2A illustrates an example when the game device according to one embodiment of the invention is implemented by a portable game device. The portable game device includes operation buttons 10, 11, 12, and 13, a direction key 14, analog sticks 16 and 18, an R-button 20, and an L-button 21 that function as the operation section 160, and also includes the display section 190 that is implemented by a liquid crystal display. Note that the device that implements the game device according to one embodiment of the invention is not limited to the device illustrated in FIG. 2A. Various modifications and variations may be made. For example, the device that implements the game device according to one embodiment of the invention may be a consumer game device (stationary game device) (see FIG. 2B), a portable communication terminal (smartphone, feature phone, or mobile phone) (see FIG. 2C), an arcade game device (see FIG. 2D), or the like. Alternatively, the game device according to one embodiment of the invention may be implemented by a server system 500 that is communicably connected to terminal devices TM1 to TMn through a network 510 (see FIG. 2E), for example. In this case, each process performed by the game device according to one embodiment of the invention may be implemented by distributed processing performed by the server system 500 and the terminal devices TM1 to TMn, for example. Each of the terminal devices TM1 to TMn may be implemented by the devices illustrated in FIGS. 2A to 2D, for example.

As illustrated in FIG. 1, the game device according to one embodiment of the invention includes the character processing section 112 that performs the character control process, the game processing section 114 that performs the game process that performs the game parameter calculation process, and the display processing section 120 that performs a display process that displays a game image based on the results of the game process. The game parameter is a parameter that is used for the game process. The game process according to one embodiment of the invention is performed based on the value of the game parameter. The character appears in the game (is displayed during the game). For example, the character is a display object that imitates a human, a soldier, a monster, a wizard, a car, a ship, an airplane, or the like.

The character processing section 112 performs a process (i.e., character control process) that controls a master character that is operated by the player, and a process (i.e., character control process) that controls a plurality of subordinate characters that are subordinate to the master character and include a first subordinate character and a second subordinate character. The master character is a character that is directly operated by the player. For example, the master character is a personified character (personified player character) that corresponds to the player. For example, the master character moves or makes a motion based on the operation information that has been input by the player using the operation section 160. For example, the master character moves or makes a motion when the player has operated the operation buttons 10 to 13, the direction key 14, the analog sticks 16 and 18, the R-button 20, and the L-button 21 illustrated in FIG. 2A. It is desirable that the master character be displayed within the game image displayed on the display section 190.

The subordinate character is a character that is subordinate to the master character (i.e., a character assigned to the master character). For example, the subordinate character acts based on instructions from the master character (i.e., instructions from the player that are issued through the master character). For example, the subordinate character moves in the game field (game space) so as to follow the master character. The player can issue various instructions (e.g., a strategic instruction and an instruction to use an item) to the subordinate character through the master character. The player can issue instructions using the operation section 160. When the player has issued an instruction, an image in which the master character issues the instruction to the subordinate character is displayed during the game. Examples of the instructions issued by the player include a strategic instruction during a battle, an instruction to use an item during a battle, an instruction to move in the game field (e.g., so as to follow the master character), an instruction to participate in a specific event (e.g., training or mini-game), and the like. The subordinate character performs various actions (e.g., moves in the game field, makes an attack or a defense during a battle, uses an item, or participates in a specific event) under control of a computer based on a predetermined action algorithm (movement-motion algorithm) so as to follow the instruction issued by the player. Note that only two characters (e.g., first subordinate character and second subordinate character) may be provided to be subordinate to the master character, or three or more subordinate characters may be provided to be subordinate to the master character.

In one embodiment of the invention, the game processing section 114 performs a process regarding a game event that involves the first subordinate character and the second subordinate character based on a first relationship parameter between the first subordinate character and the second subordinate character, a second relationship parameter between the master character and the first subordinate character, and a third relationship parameter between the master character and the second subordinate character. For example, the game processing section 114 performs a determination process regarding generation of the game event, a post-game event game parameter setting process, and the like.

The first relationship parameter is a parameter (game parameter) that is defined between the first subordinate character and the second subordinate character. The first relationship parameter is a parameter that represents the degree, the state (mode), and the like of the relationship between the first subordinate character and the second subordinate character. The second relationship parameter is a parameter that is defined between the master character and the first subordinate character. The second relationship parameter is a parameter that represents the degree, the state (mode), and the like of the relationship between the master character and the first subordinate character. The third relationship parameter is a parameter that is defined between the master character and the second subordinate character. The third relationship parameter is a parameter that represents the degree, the state (mode), and the like of the relationship between the master character and the second subordinate character. The first relationship parameter, the second relationship parameter, and the third relationship parameter are stored in the parameter storage section 172.

The game event that involves the first subordinate character and the second subordinate character refers to an event in which the first subordinate character and the second subordinate character are involved. For example, the game event that involves the first subordinate character and the second subordinate character is an event in which the first subordinate character and the second subordinate character participate, an event in which the first subordinate character and the second subordinate character appear, and the like. For example, the master character is not involved in the game event. Examples of such a game event include a union event in which the first subordinate character and the second subordinate character are united, an event in which the first subordinate character and the second subordinate character make a special motion (special technique) (e.g., special attack and special defense), a transformation event in which the first subordinate character and the second subordinate character are transformed, a battle event in which the first subordinate character and the second subordinate character participate in a battle, and the like. Only the first relationship parameter between the first subordinate character and the second subordinate character is normally reflected in such a game event since the first subordinate character and the second subordinate character are involved in the event. In one embodiment of the invention, however, the relationship parameter with respect to the master character that is a master (parent) of the first subordinate character and the second subordinate character is also reflected in the game event. Specifically, the second relationship parameter between the master character and the first subordinate character, and the third relationship parameter between the master character and the second subordinate character, are also reflected in the game event.

Examples of the process regarding the game event include a determination process regarding generation of the game event, a post-game event game parameter setting process, and the like. The determination process regarding generation of the game event is a process that determines whether or not to generate the game event, for example. When the game event is the union event, the post-game event game parameter setting process is a process that sets the game parameter of the united character, a process that sets the union duration, or the like. When the game event is the special motion event, the post-game event game parameter setting process is a process that sets a game parameter of the special motion (e.g., strength and effective range), or the like.

The game processing section 114 performs the process regarding the game event based on at least one of operation information about the player, state information about the first subordinate character and the second subordinate character, and situation information about the game, the first relationship parameter, the second relationship parameter, and the third relationship parameter. For example, at least one of the operation information about the player, the state information about the first subordinate character and the second subordinate character, and the situation information about the game, the first relationship parameter, the second relationship parameter, and the third relationship parameter (at least one of the first relationship parameter, the second relationship parameter, and the third relationship parameter), are used as the game event generation determination conditions (predetermined conditions). For example, the determination process regarding generation of the game event is performed based on whether or not the player has performed a predetermined operation, whether or not the first subordinate character and the second subordinate character have been set to a predetermined state, or whether or not the game has reached a predetermined situation, the first relationship parameter, the second relationship parameter, and the third relationship parameter (e.g., probability information that has been set based on the first relationship parameter, the second relationship parameter, and the third relationship parameter).

The operation information about the player is information that is input by the player using the operation section 160. The operation information about the player is operation information about the operation section 160 that is a game controller. The state information about the first subordinate character and the second subordinate character is information that is represented based on the game parameters and the like of the first subordinate character and the second subordinate character. For example, the state information about the first subordinate character and the second subordinate character is information that represents the strength (e.g., hit points) of the first subordinate character and the second subordinate character, information that represents the ability (e.g., attack capability, defense capability, speed, and wisdom) of the first subordinate character and the second subordinate character, or the like. The situation information about the game is information that represents the situation of the game in which the first subordinate character and the second subordinate character participate (appear). For example, the situation information about the game is situation information about an event (e.g., battle) in which the first subordinate character and the second subordinate character participate. For example, the situation information about the game is remaining time information (time limit information) about an event (e.g., battle), progress state information that represents the degree of progress of an event, information that represents the state of the environment around the first subordinate character and the second subordinate character during an event, or the like.

For example, the game processing section 114 sets generation probability information about the game event based on the values of the first relationship parameter, the second relationship parameter, and the third relationship parameter. For example, a probability table in which the first relationship parameter, the second relationship parameter, and the third relationship parameter are linked to the game event generation probability is stored in the storage section 170. The generation probability information about the game event is acquired by applying the first relationship parameter, the second relationship parameter, and the third relationship parameter to the probability table. The determination process regarding generation of the game event is performed based on at least one of the operation information about the player, the state information about the first subordinate character and the second subordinate character, and the situation information about the game, and the acquired probability information. For example, whether or not to generate the game event is determined based on whether or not the player has performed a predetermined operation, whether or not the first subordinate character and the second subordinate character have been set to a predetermined state, or whether or not the game has reached a predetermined situation, and the acquired probability information.

The game processing section 114 performs a determination process regarding generation of a union event, the union event being the game event in which the first subordinate character and the second subordinate character are united to form a united character. For example, the game processing section 114 determines whether or not to generate the union event in which the first subordinate character and the second subordinate character are united, based on the first relationship parameter between the first subordinate character and the second subordinate character, the second relationship parameter between the master character and the first subordinate character, and the third relationship parameter between the master character and the second subordinate character. Only the relationship parameter between the first subordinate character and the second subordinate character is normally used for such a union event since the first subordinate character and the second subordinate character are involved in the event. In one embodiment of the invention, the second relationship parameter between the master character and the first subordinate character, and the third relationship parameter between the master character and the second subordinate character, are also used in addition to the relationship parameter between the first subordinate character and the second subordinate character.

The union event is an event in which a new character (united character) is generated (synthesized) using the first subordinate character and the second subordinate character as materials. The united character succeeds to the ability (e.g., attack capability, defense capability, speed, and strength), the attribute, and the figure (e.g., shape) (i.e., elements) of the first subordinate character and the second subordinate character, for example. The united character may be returned to the first subordinate character and the second subordinate character when the union duration has elapsed, or may not be returned to the first subordinate character and the second subordinate character.

The game processing section 114 sets at least one of the game parameter of the united character and the union duration based on the first relationship parameter, the second relationship parameter, and the third relationship parameter (at least one of the first relationship parameter, the second relationship parameter, and the third relationship parameter). For example, the game processing section 114 adjusts the ability (e.g., attack capability, defense capability, speed, and strength), the attribute, and the like (i.e., game parameters) of the united character based on the first relationship parameter, the second relationship parameter, and the third relationship parameter. The game processing section 114 also adjusts the length of the union duration based on the first relationship parameter, the second relationship parameter, and the third relationship parameter. For example, when it has been determined that the relationship between the characters that is represented by the first relationship parameter, the second relationship parameter, and the third relationship parameter is good, the game processing section 114 adjusts the value of the game parameter so that the ability and the like of the united character increase, or increases the union duration.

The game processing section 114 performs a determination process regarding generation of a special motion event, the special motion event being the game event in which the first subordinate character and the second subordinate character make a special motion. For example, the game processing section 114 determines whether or not to cause the first subordinate character and the second subordinate character to make a special motion, based on the first relationship parameter between the first subordinate character and the second subordinate character, the second relationship parameter between the master character and the first subordinate character, and the third relationship parameter between the master character and the second subordinate character. Only the relationship parameter between the first subordinate character and the second subordinate character is normally used for such a special motion event since the first subordinate character and the second subordinate character are involved in the event. In one embodiment of the invention, the second relationship parameter between the master character and the first subordinate character, and the third relationship parameter between the master character and the second subordinate character, are also used in addition to the relationship parameter between the first subordinate character and the second subordinate character.

The special motion event is an event in which the first subordinate character and the second subordinate character make a special motion that differs from a normal motion during a battle or the like. Examples of the special motion include a special technique (e.g., special attack and special defense) that is performed during a battle, a motion that protects another subordinate character during a battle, a special movement in the game field, a special action during an event (e.g., training and mini-game), and the like. The special motion is provided in advance so as to be linked to each subordinate character as a motion that is rarely performed (i.e., is performed with a low probability). It is desirable that the special motion be performed by the first subordinate character and the second subordinate character in cooperation. Note that the special motion may be independently performed by each subordinate character. For example, one of the first subordinate character and the second subordinate character may perform the special motion, and the other of the first subordinate character and the second subordinate character may support the special motion.

Note that the battle may be a battle in a role-playing game, a fighting game, a sports game, and the like. The battle may be a battle in a competition game (e.g., car game and airplane game), or may be a battle in a quiz game. The battle may be a talk battle in a conversation game (e.g., court battle game and love simulation game), for example.

The game processing section 114 sets the game parameter of the special motion based on the first relationship parameter, the second relationship parameter, and the third relationship parameter (at least one of the first relationship parameter, the second relationship parameter, and the third relationship parameter). For example, the game processing section 114 adjusts the strength (e.g., power), the effective range (attack range), the available count (allowable implementation count), and the like (i.e., game parameters) of the special motion performed by the first subordinate character and the second subordinate character based on the first relationship parameter, the second relationship parameter, and the third relationship parameter. For example, when it has been determined that the relationship between the characters that is represented by the first relationship parameter, the second relationship parameter, and the third relationship parameter is good, the game processing section 114 increases the strength, the effective range (attack range), or the available count of the special motion.

The first subordinate character and the second subordinate character are non-player characters that are controlled by a computer, for example. For example, the master character is controlled directly based on the operation information about the player. On the other hand, the action of the subordinate character (e.g., first subordinate character and second subordinate character) is automatically controlled (AI-controlled) based on an action algorithm that is executed by a computer. For example, the subordinate character automatically performs various actions during a battle or the like under control of a computer based on an action algorithm instead of being operated directly by the player. For example, the subordinate character performs an action so as to follow an instruction (e.g., strategic instruction) issued by the player through the master character. For example, information about a plurality of action patterns of each subordinate character is stored in the storage section 170. The action algorithm selects an action pattern that corresponds to the instruction issued by the player from the plurality of action patterns, and causes the subordinate character to act to follow the selected action pattern.

The character processing section 112 controls the first subordinate character and the second subordinate character so as to act based on an instruction from the master character that is operated by the player. For example, the player operates the master character using the operation section 160, and the master character issues an instruction to the subordinate character (e.g., first subordinate character and second subordinate character) during the game. The subordinate character is computer-controlled based on the action algorithm so as to perform an action that corresponds to the instruction.

The game processing section 114 changes the second relationship parameter and the third relationship parameter based on at least one of the details of the game process performed on the master character, elapsed time information about the game, attribute information about the master character, the first subordinate character, and the second subordinate character, charge information about the player, used item information about the player, and the game parameters of the master character, the first subordinate character, and the second subordinate character.

The details of the game process performed on the master character refer to the details of the action performed by the master character on the subordinate character or the like during the game, for example. For example, when the master character has praised the subordinate character, scolded the subordinate character, fed the subordinate character, took care of the subordinate character, allowed the subordinate character to take part in a battle, allowed the subordinate character to participate in an event (e.g., mini-game or training), or selected the subordinate character, the relationship parameter (second relationship parameter and third relationship parameter) between the master character and the subordinate character changes. For example, when the master character has praised the subordinate character, scolded the subordinate character, fed the subordinate character, or took care of the subordinate character, the relationship parameter between the master character and the subordinate character increases. The relationship parameter between the master character and the subordinate character changes corresponding to the elapsed time information about the game. For example, the relationship parameter gradually decreases with the passing of time during the game. The time may be the real time, or may be the time in the game world, or may be the play time. The relationship parameter between the master character and the subordinate character changes corresponding to the attribute information about the master character and the attribute information about the subordinate character. For example, the relationship parameter between the master character and the subordinate character increases when the attribute of the master character and the attribute of the subordinate character are close to each other, or have a good relationship. On the other hand, the relationship parameter between the master character and the subordinate character decreases when the attribute of the master character and the attribute of the subordinate character considerably differ from each other, or have a bad relationship. The relationship parameter between the master character and the subordinate character increases when the player has paid the amount charged. For example, the player can increase the relationship parameter by paying in-game money or real money. The relationship parameter between the master character and the subordinate character changes when the player has used the item owned by the player. For example, the relationship parameter changes (increases or decreases) when the player has used an item to which an attribute that changes the relationship parameter is set. The item may be an item that can be acquired by the player by means of an acquisition event during the game, or may be an item that can be acquired by the player by paying money or the like. The relationship parameter between the master character and the subordinate character changes when the game parameter of at least one of the master character, the first subordinate character, and the second subordinate character has been consumed (used) or changed. For example, the relationship parameter between the master character and the subordinate character changes when the game parameters (e.g., hit points (strength value) and magic points) of the first subordinate character and the second subordinate character have been consumed (changed), or the game parameters (e.g., points (game points, trainer points, or in-game money)) of the master character have been consumed (changed).

The game processing section 114 changes the first relationship parameter based on at least one of identical event participation information about the first subordinate character and the second subordinate character, the elapsed time information about the game, the attribute information about the first subordinate character and the second subordinate character, the charge information about the player, the used item information about the player, and the game parameters of the master character, the first subordinate character, and the second subordinate character.

For example, when the first subordinate character and the second subordinate character have participated in an event (e.g., training or mini-game) together, the first relationship parameter between the first subordinate character and the second subordinate character increases. In this case, the first relationship parameter may be changed (increased or decreased) corresponding to the results or the like of the first subordinate character and the second subordinate character during the event. Alternatively, the first relationship parameter between the first subordinate character and the second subordinate character may be changed corresponding to the time that the first subordinate character and the second subordinate character participated in the event, and an item that appeared during the event, or the like. For example, the first relationship parameter gradually decreases with the passing of time during the game. The first relationship parameter changes corresponding to the attribute information about the master character and the attribute information about the subordinate character. For example, the first relationship parameter between the master character and the subordinate character increases when the attribute of the master character and the attribute of the subordinate character are close to each other, or have a good relationship, and decreases when the attribute of the master character and the attribute of the subordinate character considerably differ from each other, or have a bad relationship. The first relationship parameter increases when the player has paid the amount charged. The first relationship parameter changed when the player has used the item owned by the player. For example, the first relationship parameter changes when the player has used an item to which an attribute that changes the first relationship parameter is set. The first relationship parameter changes when the game parameter of at least one of the master character, the first subordinate character, and the second subordinate character has been consumed (used) or changed. For example, the first relationship parameter changes when the game parameters (e.g., hit points (strength value) and magic points) of the first subordinate character and the second subordinate character have been consumed (changed), or the game parameters (e.g., points (game points, trainer points, or in-game money)) of the master character have been consumed (changed).

The program and the game device according to the embodiments of the invention may be implemented by a server system. For example, the program according to one embodiment of the invention may be executed on a server system, and the game device according to one embodiment of the invention may be implemented by a server system, or may be implemented by a server system and a terminal device (client).

2. Method 2.1 Outline of Method

The method according to the embodiments of the invention is described in detail below. The embodiments of the invention employ a method that can provide an event result with a depth element by taking account of the relationship between the subordinate characters (child characters), and the relationship between the master character (parent character) and the subordinate character (child character). For example, the relationship between a plurality of subordinate characters that are subordinate to (belong to) an identical master character is converted into a numerical value, and a game event is generated when a predetermined condition has been satisfied during a game in which the numerical value changes depending on the game situation. The game parameter used in connection with the game event is determined taking account of the numerical value that represents the relationship between the subordinate characters, and the numerical value that represents the relationship between each subordinate character and the master character. The predetermined condition is determined based on whether or not the numerical value that represents each relationship is equal to or larger than a predetermined value, an input (e.g., command) performed by the player, the state of each subordinate character before the subordinate characters are united (e.g., whether or not the hit points of all of the subordinate characters have reached "0"), a timing during the game process (e.g., a timing at which the battle ends within 5 seconds), and the like. For example, when these elements have been cleared, whether or not to generate the game event is determined using the probability determined based on the numerical value that represents each relationship.

For example, the game event to be generated is a union event during a battle in which the subordinate characters are united to generate a united character. The combat capability (game parameter value) of the united character and the union duration are calculated using the numerical value that represents each relationship. The game event may be a killer technique event during a battle. For example, the killer technique event is implemented by the subordinate characters. The strength (game parameter value), the effective range (attack range), and the available count of the killer technique are calculated using the numerical value that represents each relationship. The master character is a character that is operated by the player, and the subordinate character is a character that is automatically controlled. The numerical value that represents the relationship between the master character and the subordinate character changes based on an action (e.g., feed action, caring action, and the result of a mini-game) during the game, game charge, and use of an item (e.g., energizer). The numerical value that represents the relationship between the subordinate characters changes based on whether the subordinate characters have participated in the same game event (e.g., training), game charge, and use of an item.

2.2. Game

An example of the game that is implemented according to the embodiments of the invention is described below. Although an example in which the method according to the embodiments of the invention is applied to a game in which a subordinate character battles with an enemy character under instructions from a master character is described below, the embodiments of the invention are not limited thereto. For example, the method according to the embodiments of the invention may also be applied to various other games such as an action game, a sports game, a competition game, and a combat sports game.

In one embodiment of the invention, a master character (i.e., parent character) and a subordinate character (i.e., child character) appear in the game. The master character is a character that acts based on an operation performed by the player. The master character is a personified player character. For example, the master character acts to represent the player in the game world. The subordinate character is a character that obeys the master character. For example, the subordinate character is a computer-controlled character that acts under instructions from the master character. When the subordinate character moves in the game field, for example, the subordinate character moves to follow the master character.

Figure 3:
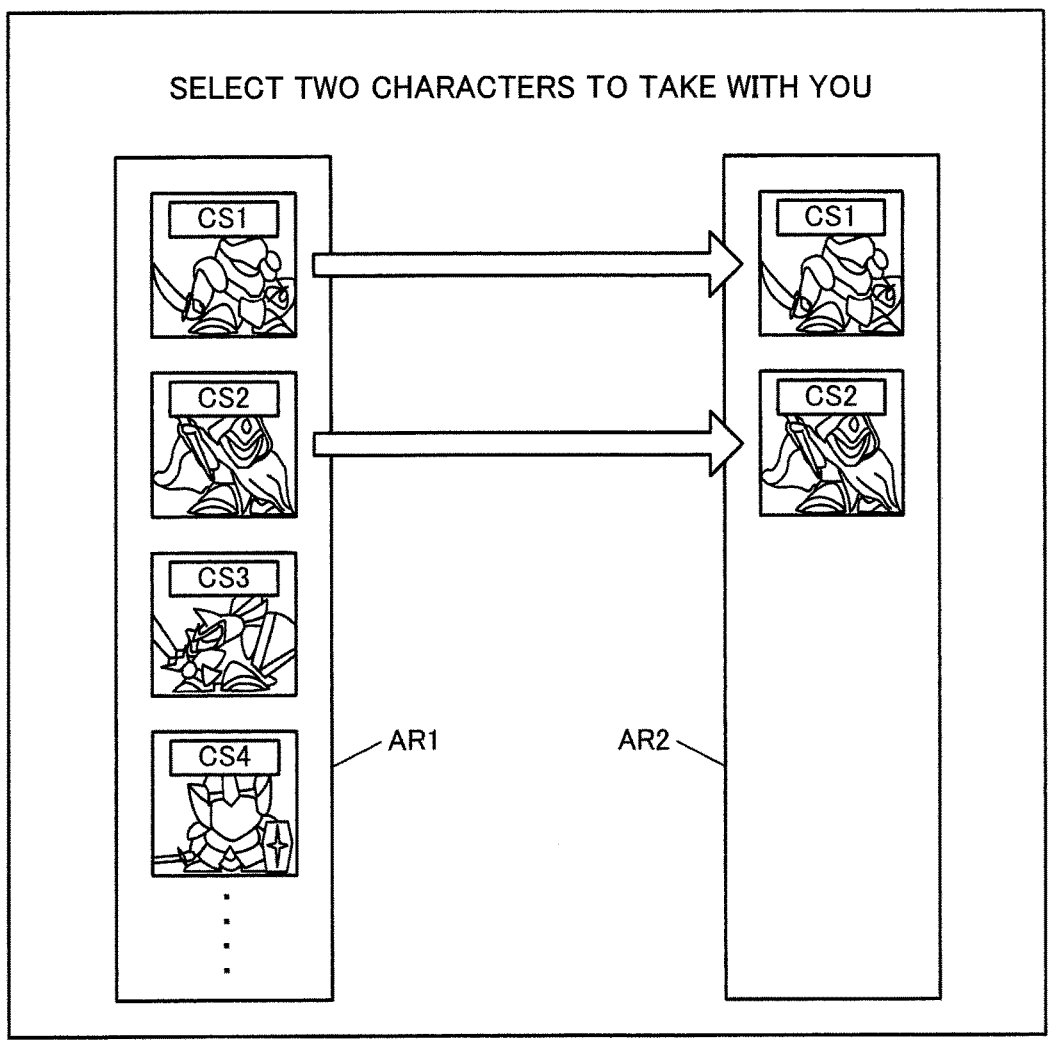
FIG. 3 illustrates an example of a subordinate character selection screen.

The player selects two subordinate characters (a plurality of subordinate characters in a broad sense) that follow the master character during game play from a plurality of characters (stock characters) that are owned by the player, for example. FIG. 3 illustrates an example of a subordinate character selection screen. A plurality of characters CS1, CS2, CS3, CS4, . . . that are owned by the player are displayed in an area AR1. The player selects the desired character (subordinate character) from these characters. In FIG. 3, the characters CS1 and CS2 displayed in the area AR2 have been selected to be the subordinate characters. The subordinate character may be selected on a game play basis, or may be selected on a battle basis. Alternatively, the subordinate character may be selected on a scenario basis or an event basis.

Figure 4:
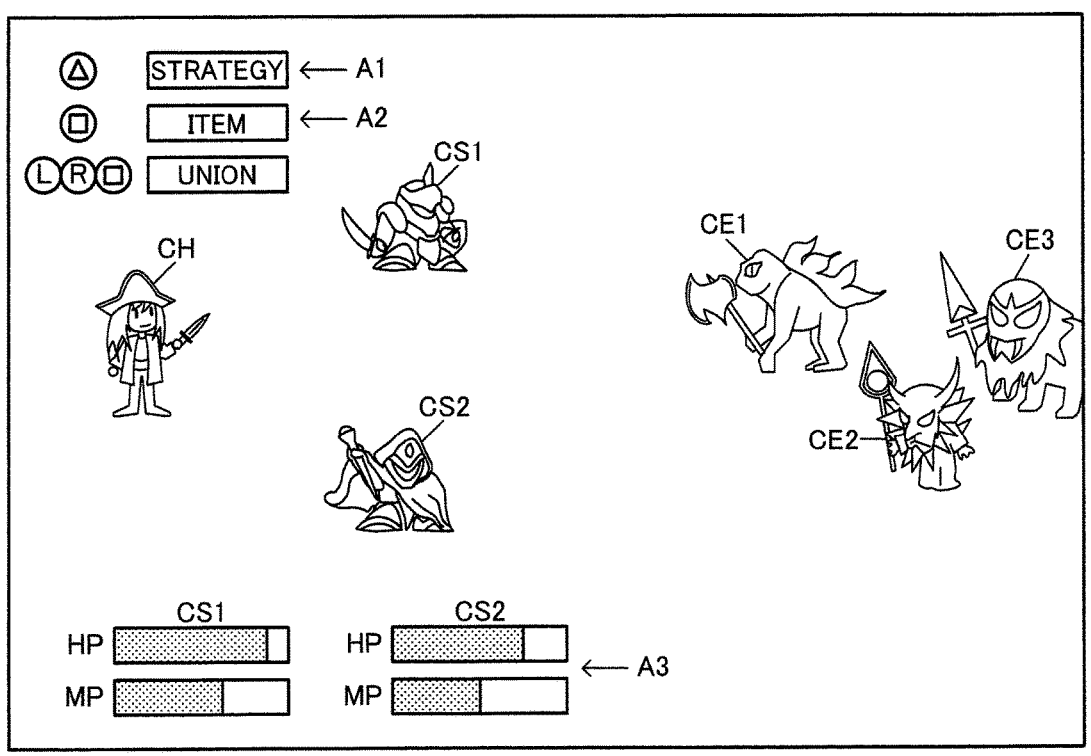
FIG. 4 illustrates an example of a battle screen of a game that is implemented according to one embodiment of the invention.

The selected subordinate characters CS1 and CS2 move in the game field of the game world so as to follow the master character CH. When the subordinate characters CS1 and CS2 have encountered an enemy in the game field, the battle screen illustrated in FIG. 4 is displayed. FIG. 4 illustrates an example in which the subordinate characters CS1 and CS2 battle with enemy characters CE1, CE2, and CE3. The master character CH issues an instruction (e.g., strategic instruction) to the subordinate characters CS1 and CS2, but does not battle with the enemy characters CE1, CE2, and CE3. Note that the number of enemy characters is arbitrary.

For example, when the player issues a strategic instruction to the subordinate characters CS1 and CS2, the player presses the operation button 11 (i.e., a button provided with a triangular mark) illustrated in FIG. 2A (see A1 in FIG. 4). When the player has pressed the operation button 11, a strategy selection screen is displayed. The player issues a strategic instruction (e.g., an instruction to attach weight to attack, an instruction to attach weight to defense, an instruction to keep strength, or an instruction to keep magical power) using the strategy selection screen. The player can also issue a strategic instruction that directly designates an attack technique that is performed by the subordinate characters CS1 and CS2. When the player desires to use an item, the player presses the operation button 12 (i.e., a button provided with a square mark) illustrated in FIG. 2A (see A2 in FIG. 4). When the player has pressed the operation button 12, an item selection screen is displayed. The player selects the desired item (e.g., an item that recovers the hit points (HP) or the magic points (MP) of the subordinate characters CS1 and CS2, an item that increases the ability parameter (e.g., attack capability, defense capability, and speed) of the subordinate characters CS1 and CS2, or an item that cures an abnormality in state of the subordinate characters CS1 and CS2) using the item selection screen to assist the subordinate characters CS1 and CS2 to battle with the enemy characters CE1, CE2, and CE3. Note that the ability of the subordinate characters CS1 and CS2 may be increased when the subordinate characters CS1 and CS2 are encouraged or cheered, for example.

The hit points (HP) and the magic points (MP) are set to the subordinate characters CS1 and CS2 (see A3 in FIG. 4). The subordinate characters CS1 and CS2 are unable to battle with the enemy characters CE1, CE2, and CE3 when the hit points have reached "0", and are unable to use magic when the magic points have reached "0". The battle game is terminated when all of the enemy characters CE1, CE2, and CE3 have been defeated, or the subordinate characters CS1 and CS2 have become unable to battle with the enemy characters CE1, CE2, and CE3, or when a time limit has been reached.

2.3 Event Process Based on Relationship Parameter

In one embodiment of the invention, a relationship parameter is set between the subordinate characters, and between the master character and each subordinate character. The relationship parameter is a numerical parameter that represents the relationship between the subordinate characters, or the relationship between the master character and each subordinate character.

Figure 5A:
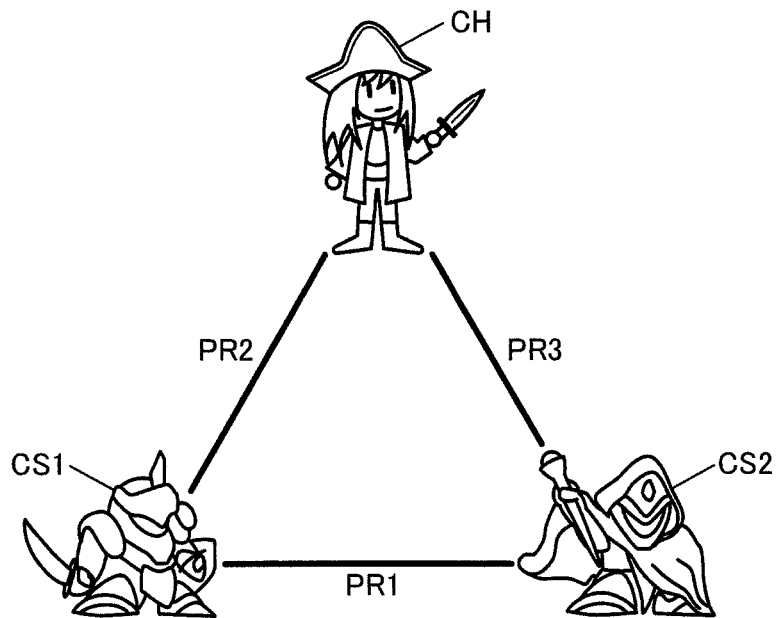
FIGS. 5A and 5B are views illustrating a relationship parameter.

As illustrated in FIG. 5A, a first relationship parameter PR1 is set between the first subordinate character CS1 and the second subordinate character CS2, a second relationship parameter PR2 is set between the master character CH and the first subordinate character CS1, and a third relationship parameter PR3 is set between the master character CH and the second subordinate character CS2, for example. Specifically, the relationship parameters PR1, PR2, and PR3 having a triangular relationship are set between the master character CH, the subordinate character CS1, and the subordinate character CS2.

For example, when a process regarding a game event (e.g., union event and special motion event) (described later) is performed, only the relationship parameter PR1 between the subordinate characters CS1 and CS2 is normally taken into consideration since the parties or targets (main figures) involved in the game event are the subordinate characters CS1 and CS2. For example, when two characters are united (synthesized) to generate a united character, a process is normally performed on the union event while only the relationship parameter between the two characters to be united is taken into consideration (see the related art described above). When two characters make a special motion (e.g., killer technique) in cooperation, for example, a process is normally performed on the special motion event while only the relationship parameter between the two characters that make an attack is taken into consideration.

In one embodiment of the invention, however, a process regarding a game event (e.g., union event or special motion event) is performed based on the relationship parameter PR1 between the subordinate characters CS1 and CS2, the relationship parameter PR2 between the master character CH and the subordinate character CS1, and the relationship parameter PR3 between the master character CH and the subordinate character CS2 (see FIG. 5A). For example, a process that determines whether or not to generate the game event (i.e., a determination process regarding generation of the game event), a process that sets the game parameter (e.g., the game parameter with respect to the united character or the special motion) after the game event has been generated (i.e., post-game event game parameter setting process), and the like are performed based on the relationship parameters PR1, PR2, and PR3.

Figure 5B:
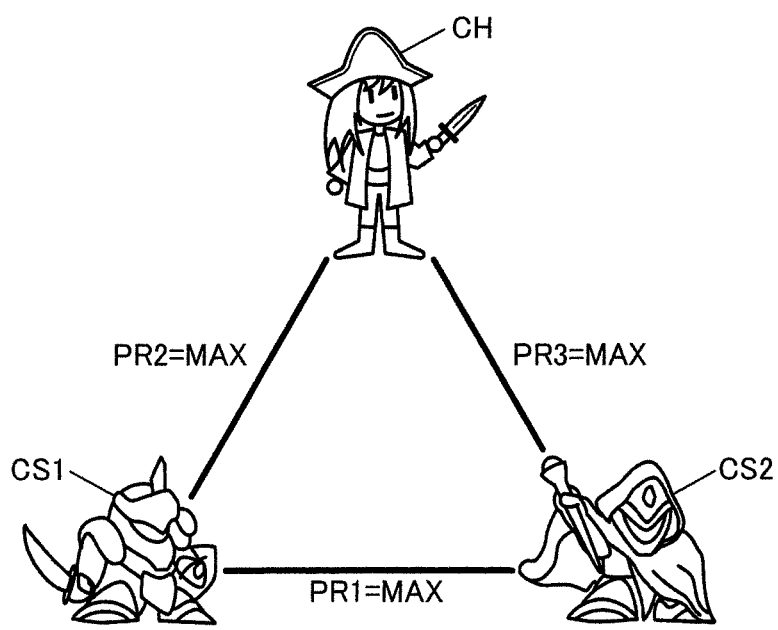

In the example illustrated in FIG. 5B, the relationship parameter PR1 between the subordinate characters CS1 and CS2, the relationship parameter PR2 between the master character CH and the subordinate character CS1, and the relationship parameter PR3 between the master character CH and the subordinate character CS2 have been set to the maximum value (MAX).

FIG. 6 illustrates an example in which the player has performed an operation that generates the union event (see FIG. 6) in a state in which the relationship parameters PR1, PR2, and PR3 have been set to the maximum value. In the example illustrated in FIG. 6, an operation that presses the R-button 20, the L-button 22, and the operation button 12 (i.e., a button provided with a square mark) (see FIG. 2A) at the same time is assigned to the union event generation command. Specifically, when the player has performed a predetermined operation (i.e., an operation that presses the R-button 20, the L-button 22, and the operation button 12 at the same time) as illustrated in FIG. 6 in a state in which the relationship parameters PR1, PR2, and PR3 have been set to a predetermined state (e.g., maximum value) as illustrated in FIG. 5B, a union event that unites the subordinate characters CS1 and CS2 is generated. Specifically, a process that determines whether or not to generate the union event (game event in a broad sense) is performed based on the operation information about the player.

Figure 7:
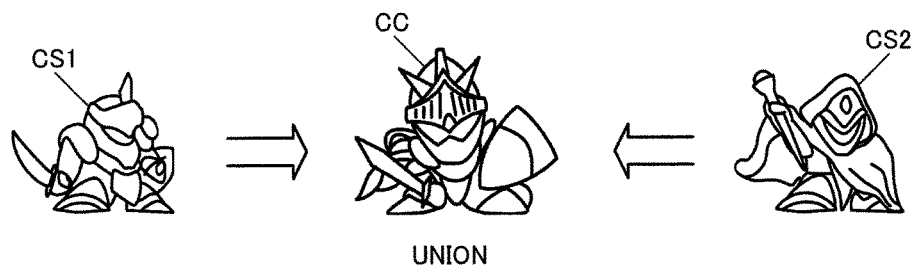
FIG. 7 is a view illustrating a subordinate character union process.
Figure 8:
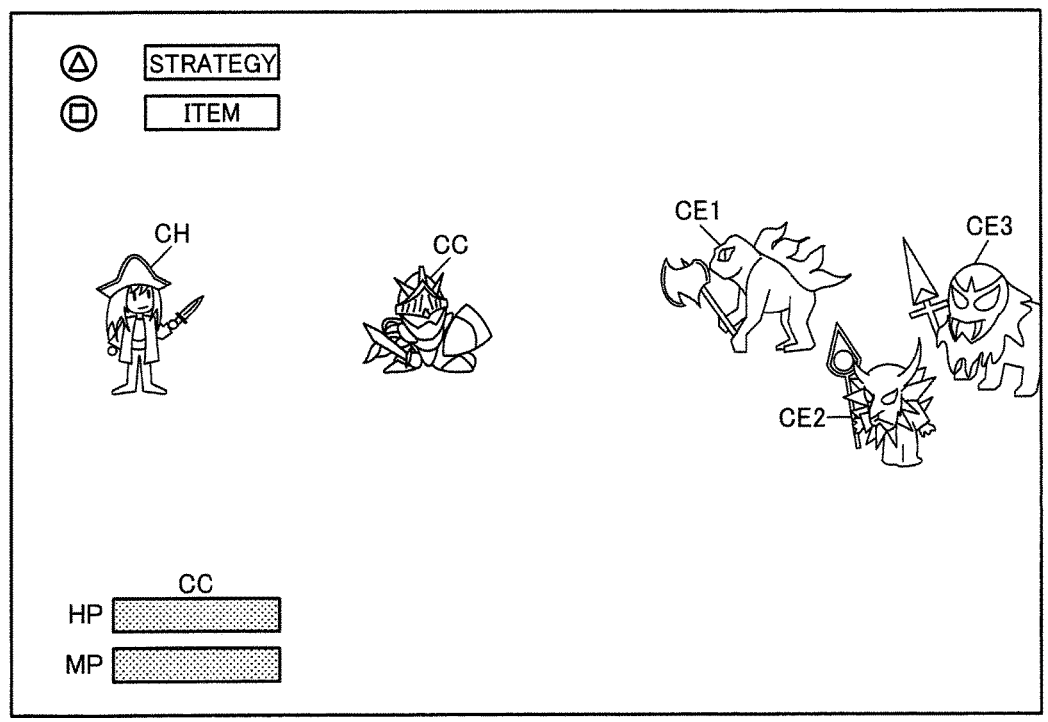
FIG. 8 illustrates an example of a battle screen using a united character.

When the union event has been generated, the subordinate characters CS1 and CS2 are united to generate a united character CC (see FIG. 7). As illustrated in FIG. 8, the united character CC battles with the enemy characters CE1 to CE3 instead of the subordinate characters CS1 and CS2. The ability parameters (e.g., attack capability, defense capability, speed, and magical power) of the united character CC are set to be larger than those of the subordinate characters CS1 and CS2, and the united character CC can perform a special killer technique (special motion in a broad sense) that cannot be performed by the subordinate characters CS1 and CS2. Therefore, the player can advantageously proceed with the battle when the united character CC has appeared. Note that the united character CC is returned to the subordinate characters CS1 and CS2 when a predetermined union duration has elapsed.

The condition whereby the union event is generated is not limited to the operation information about the player. For example, whether or not to generate the union event may be determined based on state information about the subordinate characters CS1 and CS2.

Figure 9:
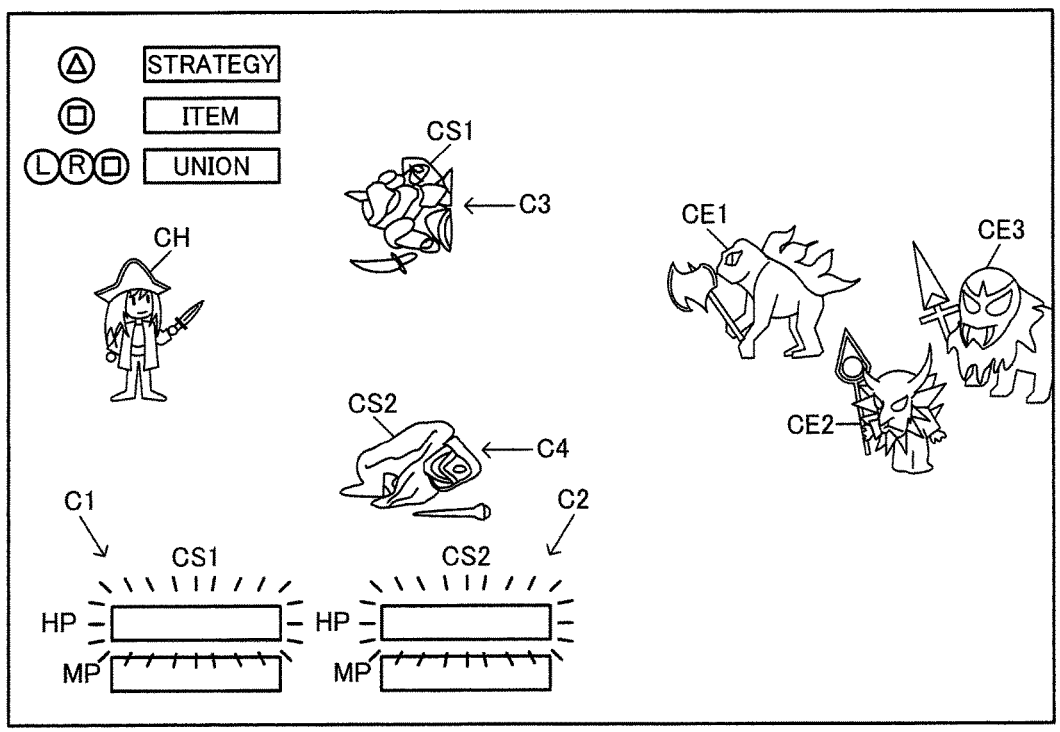
FIG. 9 is a view illustrating a determination method regarding generation of a union event based on state information about a subordinate character.

In the example illustrated in FIG. 9, the hit points (HP) of the subordinate characters CS1 and CS2 have reached "0" (see C1 and C2), and the subordinate characters CS1 and CS2 have been set to a disabled state (see C3 and C4). When the subordinate characters CS1 and CS2 have been set to such a predetermined state (e.g., hit points=0), the union event is automatically generated even when the player has not performed a given operation that generates the union command (see FIG. 6). The subordinate characters CS1 and CS2 thus revive as the united character CC, and continue to battle with the enemy characters CE1 to CE3 (see FIG. 8). According to this configuration, when the relationship parameters PR1, PR2, and PR3 have been set to a large value as illustrated in FIG. 5B, it is determined that the master character CH and the subordinate characters CS1 and CS2 are tied very firmly, and the subordinate characters CS1 and CS2 that have been set to a disabled state (see C3 and C4 in FIG. 9) revive as the united character CC. This makes it possible to effectively motivate the player to increase the relationship parameters PR1, PR2, and PR3. Specifically, since the subordinate characters CS1 and CS2 revive as the united character CC when the relationship parameters PR1, PR2, and PR3 have been set to a large value, the player becomes aware that a strong bond is formed between the master character CH and the subordinate characters CS1 and CS2. Therefore, the player develops strong feelings for the subordinate characters CS1 and CS2 in the game world, and becomes more involved in the game.

Note that whether or not to generate the union event may be determined based on situation information about the game in addition to (instead of) the operation information about the player and the state information about the subordinate characters CS1 and CS2. For example, the union event (see FIGS. 7 and 8) may be generated (even when the hit points of the subordinate characters CS1 and CS2 have not reached "0") when the hit points of the subordinate characters CS1 and CS2 have become equal to or smaller than a predetermined value (e.g., "10") (i.e., moribund state) in a predetermined game situation (e.g., when the time limit of the game is reached in 5 seconds). Specifically, the union event is generated in a predetermined game situation (e.g., when the time limit is reached in 5 seconds) even when the hit points have not reached "0" (see FIG. 9). Alternatively, the union event is generated with a given probability in a game situation in which the hit points of the subordinate characters CS1 and CS2 have significantly decreased in a state in which the hit points of the enemy characters CE1 to CE3 are high (i.e., when it is likely that the player will lose the game), for example. In this case, the player can turn the tables due to the appearance of the united character by means of the union event even in a game situation in which it is likely that the player will lose the game. This makes it possible to improve the interest of the game.

The game event (e.g., union event) need not necessarily be generated when the relationship parameters PR1, PR2, and PR3 have been set to the maximum value (see FIG. 5B). For example, the game event (e.g., union event) may be generated with a given probability even when the relationship parameters PR1, PR2, and PR3 have been set to about 70 to 99% with respect to the maximum value. For example, when the relationship parameters PR1, PR2, and PR3 have been set to 90% with respect to the maximum value, the game event (e.g., union event) is generated with a probability of about 50 to 60%. When the relationship parameters PR1, PR2, and PR3 have been set to 70% with respect to the maximum value, the game event (e.g., union event) is generated with a probability of about 5 to 10%. For example, the game event (e.g., union event) is generated with a probability that is set based on the relationship parameters PR1, PR2, and PR3 when the player has performed a game operation that generates the union event (see FIG. 6), or when the subordinate characters CS1 and CS2 have been set to the state illustrated in FIG. 9, or when the game situation described above has occurred (e.g., when the hit points are equal to or smaller than a predetermined value in a state in which the time limit is reached in 5 seconds).

The game parameters of the united character CC, the union duration, and the like may be set based on the relationship parameters PR1, PR2, and PR3 (as described later) instead of merely determining whether or not to generate the union event based on the relationship parameters PR1, PR2, and PR3. For example, when the united character CC has appeared in a state in which the relationship parameters PR1, PR2, and PR3 have been set to a large value, the ability parameters (e.g., attack capability, defense capability, magical power, and speed) of the united character CC are increased, or the union duration is increased. In this case, the player can advantageously proceed with the game when strong bonds (PR2 and PR3) have been formed between the master character CH and the subordinate characters CS1 and CS2.

Figure 10:
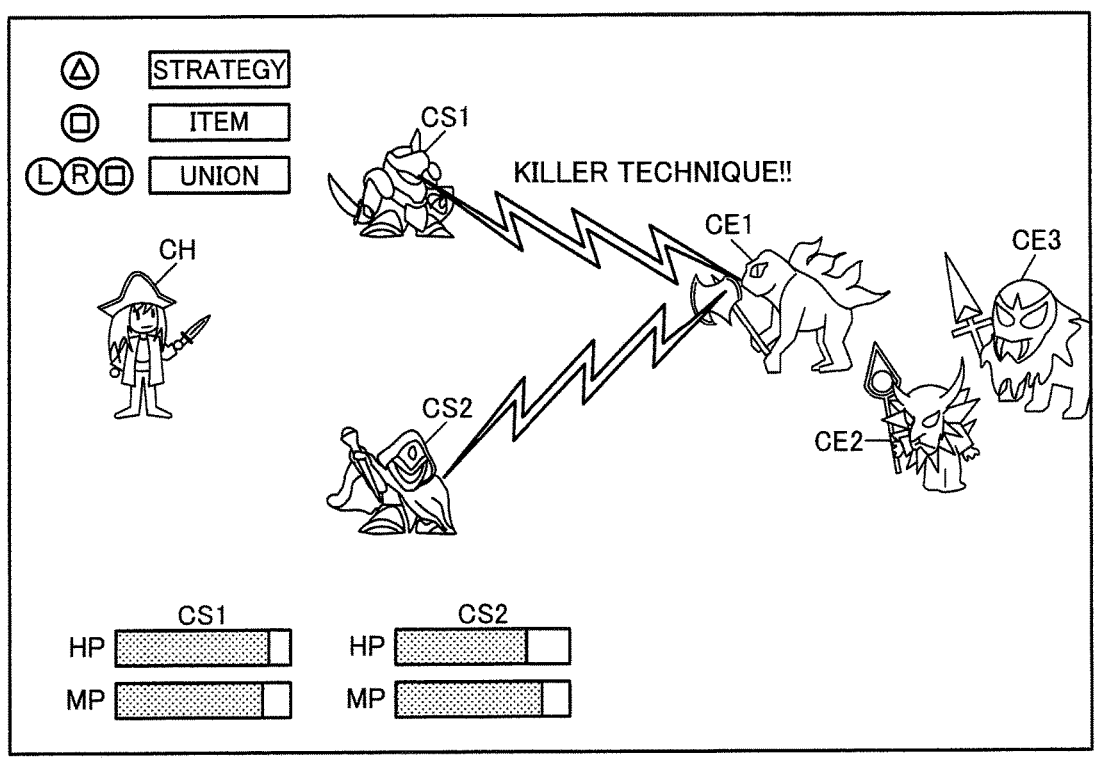
FIG. 10 is a view illustrating a method that causes a subordinate character to perform a killer technique based on a relationship parameter.

The game event to be generated is not limited to the union event illustrated in FIGS. 7 and 8. For example, a special motion event in which the subordinate characters CS1 and CS2 make a special motion (e.g., killer technique) may be generated as the game event. For example, when the relationship parameters PR1, PR2, and PR3 have been set to a value that is equal to or larger than a predetermined value (e.g., when the relationship parameters PR1, PR2, and PR3 have been set to the maximum value) (see FIG. 5B), the subordinate characters CS1 and CS2 are caused to perform a killer technique (see FIG. 10). For example, the subordinate characters CS1 and CS2 may be caused to perform a killer technique (see FIG. 10) when the relationship parameters PR1, PR2, and PR3 have been set to a value that is equal to or larger than a predetermined value, and the player has performed a predetermined operation that causes the subordinate characters CS1 and CS2 to perform a killer technique, or may be automatically caused to perform a killer technique at a given timing when the relationship parameters PR1, PR2, and PR3 have been set to a value that is equal to or larger than a predetermined value. The game parameters (e.g., the strength, the effective range (attack range), or the available count of the killer technique (special motion in a broad sense)) may be set based on the relationship parameters PR1, PR2, and PR3. For example, the strength, the effective range, or the available count of the killer technique is increased as the relationship parameters PR1, PR2, and PR3 increase. It is desirable that the killer technique illustrated in FIG. 10 be performed by the subordinate characters CS1 and CS2 in cooperation. Note that the killer technique illustrated in FIG. 10 may be a killer technique (special motion) that is independently performed by each of the subordinate characters CS1 and CS2. For example, when the relationship parameter PR2 between the master character CH and the subordinate character CS1 has been set to a large value, the subordinate character CS1 is caused to perform the killer technique, or the probability that the subordinate character CS1 performs the killer technique is increased. When the relationship parameter PR3 between the master character CH and the subordinate character CS2 has been set to a large value, the subordinate character CS2 is caused to perform the killer technique, or the probability that the subordinate character CS2 performs the killer technique is increased.

The game event that is generated based on the relationship parameter may be an evolution event with respect to the subordinate character. For example, the subordinate character evolves into a character having a larger ability parameter (ability value upper limit) when a predetermined condition has been satisfied. Whether or not to generate such an evolution event may also be determined based on the relationship parameter. For example, whether or not to generate the evolution event is determined taking account of the relationship parameter between the master character and the subordinate character in addition to the experience value, the level, the age, or the like of the subordinate character.

2.4 Relationship Parameter Setting Method

Figure 11A:
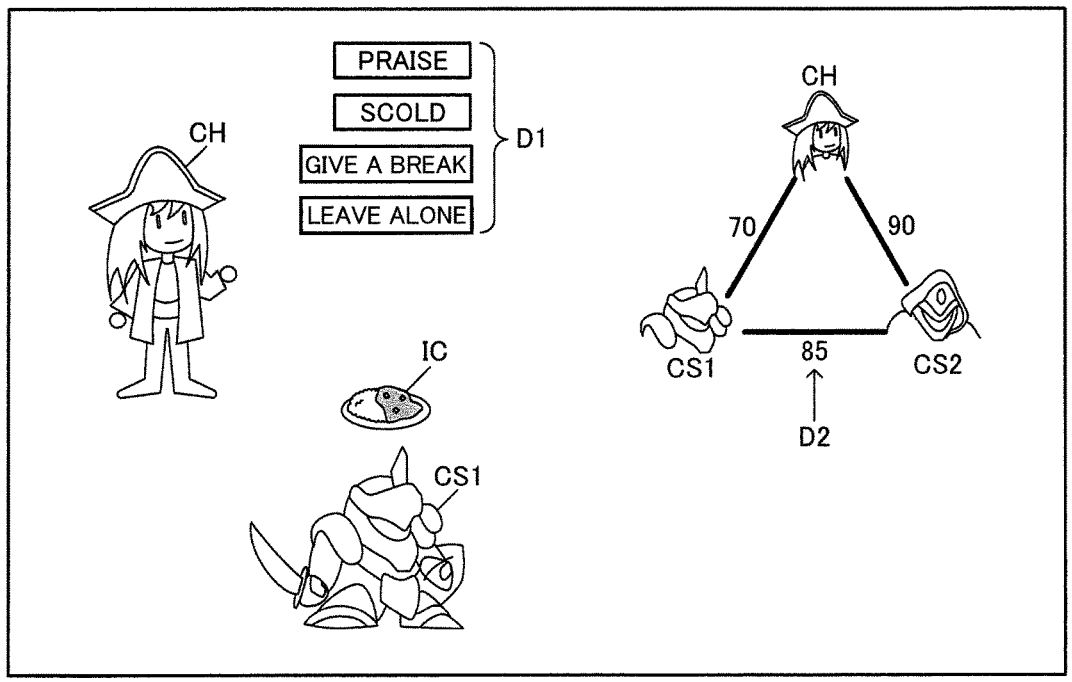
FIGS. 11A and 11B are views illustrating a method for setting a relationship parameter between a master character and a subordinate character.
Figure 11B:
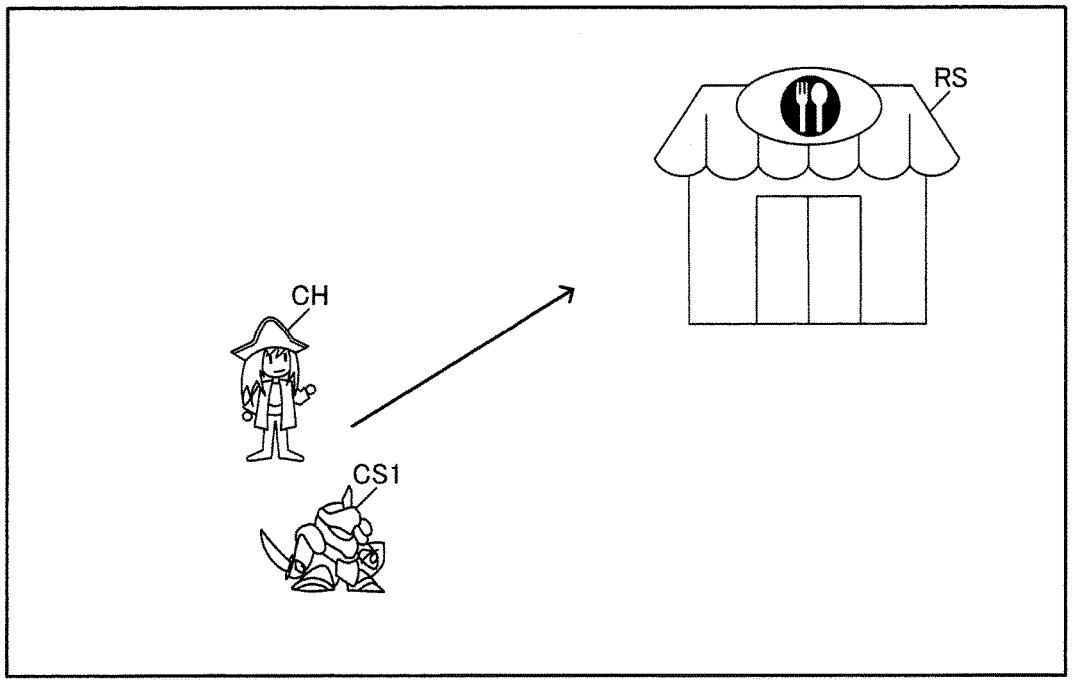

The details of the method for setting the relationship parameters PR1, PR2, and PR3 are described below. FIGS. 11A and 11B are views illustrating the method for setting the relationship parameter PR2 between the master character CH and the subordinate character CS1. The relationship parameter PR3 between the master character CH and the subordinate character CS2 is set in the same manner as the relationship parameter PR2 between the master character CH and the subordinate character CS1. Therefore, detailed description thereof is omitted.

In the example illustrated in FIG. 11A, an icon IC that represents a meal is displayed above the subordinate character CS1. The icon IC is displayed so as to be linked to the subordinate character CS1 when the subordinate character CS1 is hungry. In this case, the relationship parameter PR2 between the master character CH and the subordinate character CS1 increases when the master character CH takes the subordinate character CS1 to a restaurant RS that is placed within the game field (game space) (see FIG. 11B). For example, a mood level parameter (or hungry level parameter) has been set to the subordinate character CS1 as a training parameter (i.e., game parameter). The mood level parameter of the subordinate character CS1 increases when the master character CH has taken the subordinate character CS1 to the restaurant RS or the like, or has given a meal item to the subordinate character CS1. The relationship parameter PR2 between the master character CH and the subordinate character CS1 increases corresponding to the increase in the mood level parameter. Note that the mood level parameter gradually decreases with the passing of time (real time or game time), and the relationship parameter PR2 gradually decreases along with a decrease in the mood level parameter.

The master character CH performs an action "PRAISE", "SCOLD", "GIVE A BREAK", "LEAVE ALONE", or the like (see D1 in FIG. 11A) on the subordinate character CS1 corresponding to a selection operation performed by the player. For example, a discipline level parameter, a rest level (sleep level) parameter, and the like have been set to the subordinate character CS1 as the training parameters in addition to the mood level parameter. For example, when the master character CH has performed the action "PRAISE" on the subordinate character CS1, the mood level parameter of the subordinate character CS1 increases. In this case, the discipline level parameter of the subordinate character CS1 decreases. For example, when the master character CH has performed the action "PRAISE" on the subordinate character CS1 that has won the battle, the mood level parameter of the subordinate character CS1 increases to a large extent. Note that the discipline level parameter decreases to only a small extent when the master character CH has performed the action "PRAISE" on the subordinate character CS1 after training (described later), for example. On the other hand, when the master character CH has performed the action "SCOLD" on the subordinate character CS1, the discipline level parameter of the subordinate character CS1 increases. In this case, the mood level parameter of the subordinate character CS1 decreases. When the master character CH has performed the action "GIVE A BREAK" on the subordinate character CS1, the rest level parameter of the subordinate character CS1 increases. When the master character CH has left the subordinate character CS1 alone without giving a break, the discipline level parameter of the subordinate character CS1 decreases.

As described above, the training parameters of the subordinate character CS1 can be changed in various ways by causing the master character CH to perform various actions on the subordinate character CS1. The relationship parameter PR2 between the master character CH and the subordinate character CS1 increases as the training parameters (e.g., mood level parameter, discipline level parameter, and rest level parameter) increase, and a stronger bond is formed between the master character CH and the subordinate character CS1. For example, the training parameters gradually decrease with the passing of time, and the relationship parameter also gradually decreases with the passing of time along with a decrease in the training parameters. Therefore, the player must frequently play the game so that the training parameters and the relationship parameter do not decrease. This makes it possible to effectively prompt the player to continue to play the game, and improve the game operation rate and the like.

The relationship parameter PR1 between the subordinate characters CS1 and CS2, the relationship parameter PR2 between the master character CH and the subordinate character CS1, and the relationship parameter PR3 between the master character CH and the subordinate character CS2 are displayed to the player within the game screen (see D2 in FIG. 11A). The player raises the subordinate characters CS1 and CS2, and causes the subordinate characters CS1 and CS2 to participate in various events so that the relationship parameters PR1, PR2, and PR3 increase while observing the relationship parameters PR1, PR2, and PR3. The player can advantageously proceed with the game by battling with the enemy when the relationship parameters PR1, PR2, and PR3 have increased (e.g., have reached the maximum value (see FIG. 5B)) so that the union event (see FIGS. 7 and 8) or the killer technique event (see FIG. 10) is generated.

Figure 12A:
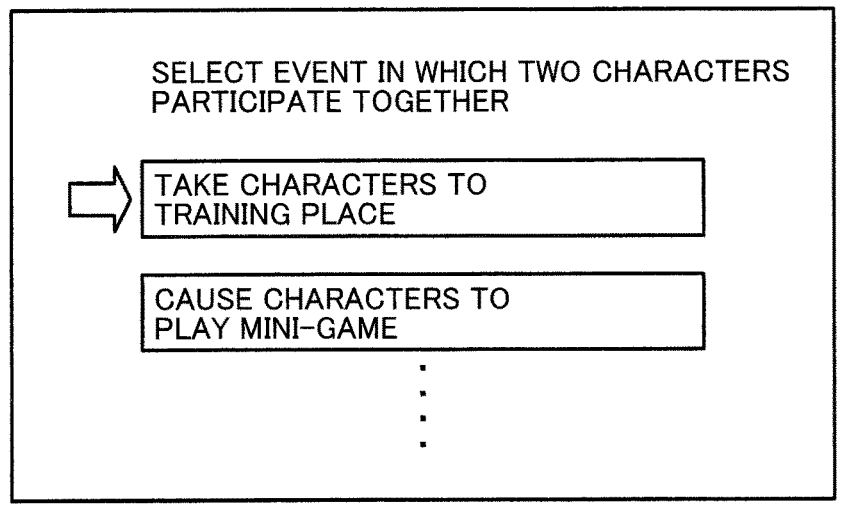
FIGS. 12A and 12B are views illustrating a method for setting a relationship parameter between subordinate characters.

The relationship parameter PR1 between the subordinate characters CS1 and CS2 increases when the subordinate characters CS1 and CS2 have participated in the same event, for example. Examples of the event in which the subordinate characters CS1 and CS2 participate together include a training event in a training place, a mini-game event, and the like (see FIG. 12A).

Figure 12B:
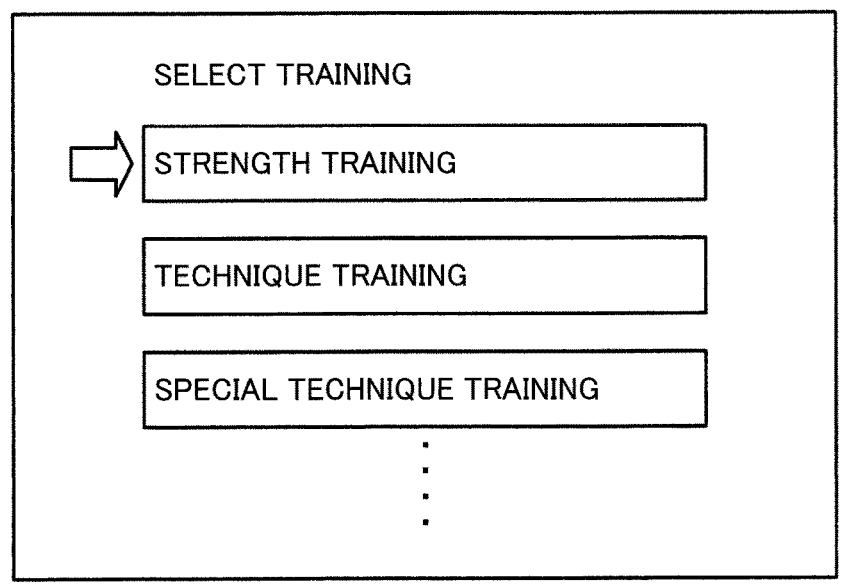

For example, when the master character CH has taken the subordinate characters CS1 and CS2 to a training place that is placed within the game field, the selection screen illustrated in FIG. 12B is displayed. The player selects a training to be performed by the subordinate characters CS1 and CS2 using the selection screen. When the subordinate characters CS1 and CS2 have performed the selected training, the ability parameters (e.g., attack capability, defense capability, and speed) and the training parameters of the subordinate characters CS1 and CS2 increase. The bond between the subordinate characters CS1 and CS2 becomes stronger when the subordinate characters CS1 and CS2 have participated in the same training event, and the relationship parameter PR1 between the subordinate characters CS1 and CS2 increases.

Figure 13A:
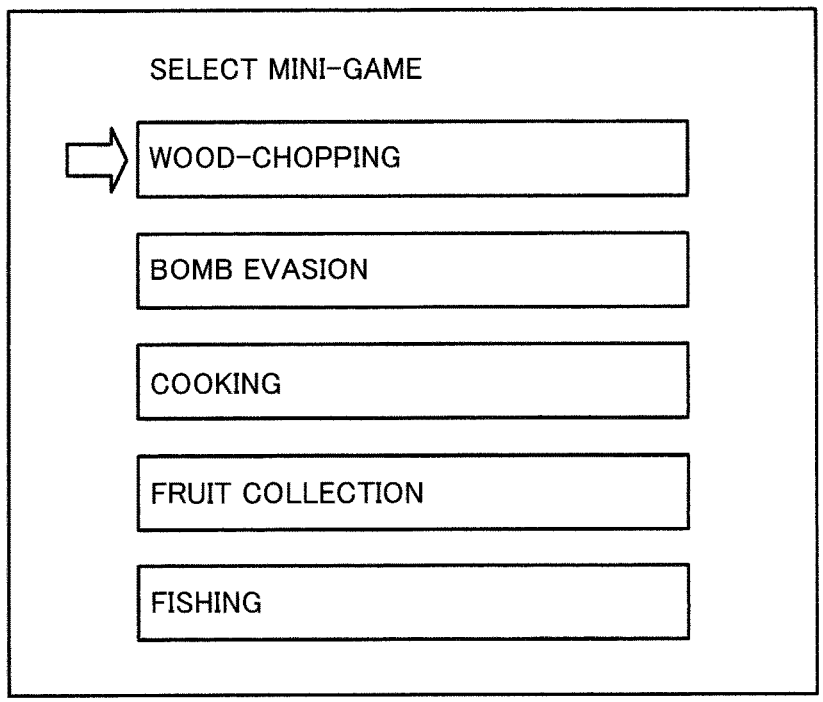
FIGS. 13A and 13B are views illustrating a method for changing a relationship parameter between subordinate characters.

When the master character CH has taken the subordinate characters CS1 and CS2 to a mini-game arcade that is placed within the game field, the selection screen illustrated in FIG. 13A is displayed. The player selects a mini-game (e.g., wood-chopping, bomb evasion, cooking, fruit collection, or fishing) to be played by the subordinate characters CS1 and CS2.

The wood-chopping mini-game is a game in which the subordinate character cuts a secured log in two by giving a killer chop. The subordinate characters compete to cut logs in two one by one in a timely manner. The bomb evasion mini-game is a game in which the subordinate character is moved to the right or left so as to avoid dropping bombs. The cooking mini-game is a game in which skewed meat is grilled on burning fire for several seconds. The subordinate characters compete to skillfully grill skewed meat by adjusting the grilling time taking account of a change in the strength of fire. The fruit collection mini-game is a game in which the subordinate characters collect apples and nuts such as walnuts in a forest. The master character takes the subordinate characters to a place where it is likely that apples and nuts are found, and instructs the subordinate characters to find apples and nuts. When the subordinate characters have found apples and nuts, a message "One apple and two walnuts have been found!" or the like is displayed, and points are added to the score. In the fishing mini-game, the master character instructs the subordinate characters to fish in a pond using a fishing rod. When a fish has been caught, a message "Black bass!" or the like is displayed, and points are added to the score.

Figure 13B:
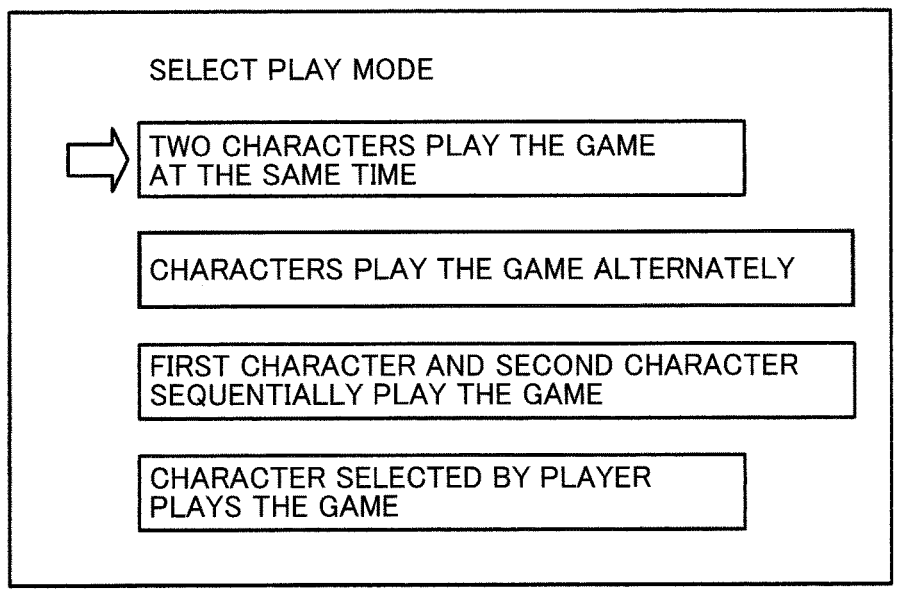

The play modes illustrated in FIG. 13B are provided to these mini-games, for example. The play modes include a first play mode in which two characters (subordinate characters) play the game at the same time, a second play mode in which the characters play the game alternately, a third play mode in which the first character and the second character sequentially play the game, and a fourth play mode in which the character selected by the player plays the game, for example. In the first to third play modes, the relationship parameter between the subordinate characters increases since two subordinate characters play the same mini-game together. In the first play mode in which two subordinate characters play the game at the same time, the relationship parameter between the subordinate characters increases to a large extent. In the fourth play mode, the relationship parameter between the master character and the subordinate character increases since the player selects the subordinate character. Note that the relationship parameter between the subordinate characters may also be increased even when two subordinate characters have separately played an identical mini-game or training at different times since the subordinate characters have participated in a common event.

FIGS. 14A to 14D illustrate an example of the game parameters and the like of the master character, the subordinate character, and the united character, and the relationship parameters.

The game parameters of the master character include an attribute, a level, a trainer ability, trainer points, game points, an acquired skill, an owned character, an owned item, and the like. The relationship (compatibility) between the attribute of the master character and the attribute of the subordinate character is determined when the relationship parameter is set. The level is the level of the master character in the game. The experience value and the level increase when the subordinate characters have won a battle, or succeeded in an event. The trainer ability represents the ability of the master character as a trainer that trains the subordinate characters. When the trainer ability is high, the ability parameter and the training parameter of the subordinate character increase to a large extent. The trainer points are consumed when the subordinate character has participated in a training or a training event. The game points of the player are also consumed when the trainer points are consumed. The skill is the skill of the master character with regard to the training of the subordinate character, for example. Examples of the skill include a skill that can improve the attack capability, the defense capability, and the like (ability parameters) of the subordinate character, a skill that can improve the speed, the wisdom, and the like (ability parameters) of the subordinate character, a skill that can improve the discipline level, the mood level, and the like (training parameters) of the subordinate character, and the like. The owned character, the owned item and the like described above with reference to FIG. 3 are also linked to the master character.

Examples of the attribute of the subordinate character and the attribute of the united character include fire, ice, water, earth, light, darkness, a machine, and the like. When the attributes of the characters have a good relationship, the relationship parameter increases to a large extent. The attack capability, the defense capability, the speed, and the wisdom are ability parameters, and affect victory or defeat during a battle, and the like. The bond parameter is a parameter that significantly affects the relationship parameter. When the bond parameter has increased, the relationship parameter between the master character and the subordinate character increases to a large extent. A normal technique and a special technique (killer technique) that can be performed by each character are linked to the subordinate character and the united character.

As illustrated in FIG. 14D, the relationship parameters include the relationship parameter PR1 between the subordinate characters CS1 and CS2, the relationship parameter PR2 between the master character CH and the subordinate character CS1, and the relationship parameter PR3 between the master character CH and the subordinate character CS2.

Figure 15A:
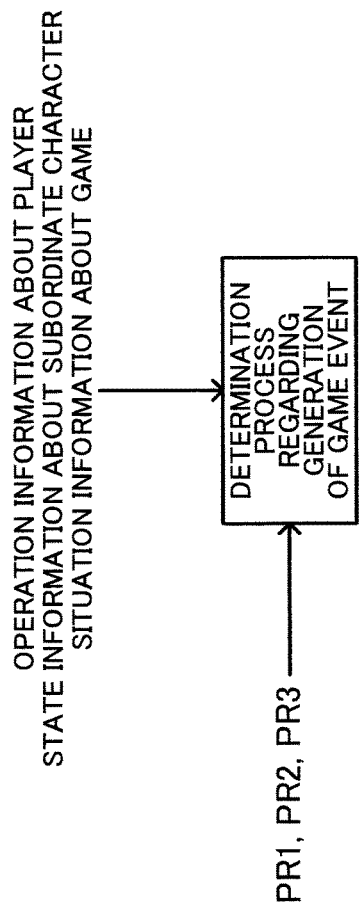
FIGS. 15A and 15B are views illustrating a determination process regarding generation of a game event based on a relationship parameter.
Figure 15B:
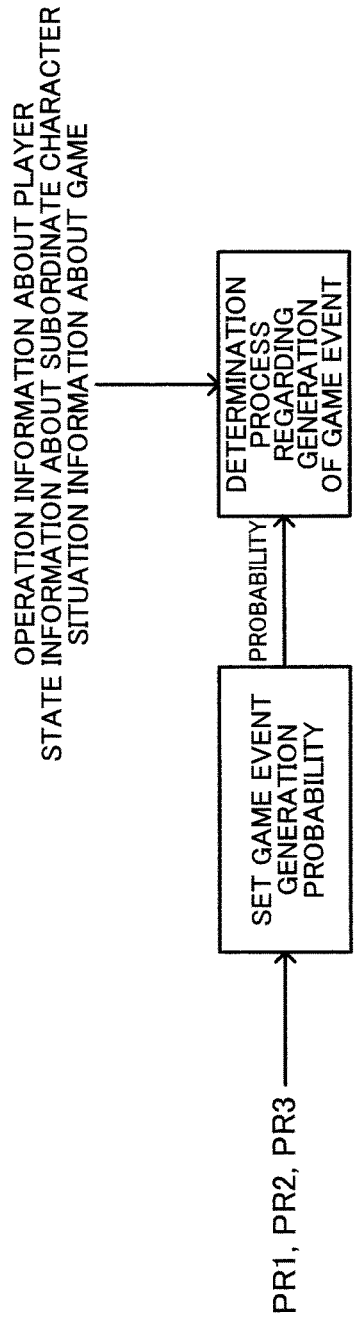

FIGS. 15A to 16B are views illustrating the details of the event process according to one embodiment of the invention. As illustrated in FIG. 15A, the determination process regarding generation of the game event (i.e., a process regarding a game event in a broad sense) is performed based on the operation information about the player, the state information about the subordinate character, or the situation information about the game, and the relationship parameters PR1, PR2, and PR3. As illustrated in FIG. 15B, the game event generation probability is set based on the values of the relationship parameters PR1, PR2, and PR3. The determination process regarding generation of the game event is performed based on the probability that has been set as described above, and the operation information about the player, the state information about the subordinate character, or the situation information about the game.

For example, when the relationship parameters PR1, PR2, and PR3 have been set to the maximum value (see FIG. 5B), the probability is set to 100%, for example. Therefore, when the player has performed a game operation (operation information about the player) that generates the union event (see FIG. 6), the union event in which the subordinate characters CS1 and CS2 are united is generated with a probability of 100%. The union event is also generated with a probability of 100% when the hit points (state information about the subordinate character) of the subordinate characters CS1 and CS2 have reached "0" (see FIG. 9). The union event is also generated with a probability of 100% when the hit points have become equal to or smaller than a predetermined value when the time limit is reached in 5 seconds (status information about the game).

The game event generation probability significantly decreases when the relationship parameters PR1, PR2, and PR3 are smaller than the maximum value. For example, the game event generation probability decreases exponentially. For example, when the relationship parameters PR1, PR2, and PR3 have been set to 90% with respect to the maximum value, the game event generation probability is set to about 50 to 60%. When the relationship parameters PR1, PR2, and PR3 have been set to 70% with respect to the maximum value, the game event generation probability is set to about 5 to 10%, for example. Therefore, when the relationship parameters PR1, PR2, and PR3 have been set to 90% with respect to the maximum value, the union event is generated with a probability of 50 to 60% (i.e., is not necessarily generated) even when the player has performed a game operation that generates the union event, or the hit points of the subordinate characters CS1 and CS2 have reached "0", for example. When the relationship parameters PR1, PR2, and PR3 have been set to 70% with respect to the maximum value, the union event is generated with a probability of 5 to 10% even when the player has performed a game operation that generates the union event, or the hit points of the subordinate characters CS1 and CS2 have reached "0", for example.

Figure 16A:
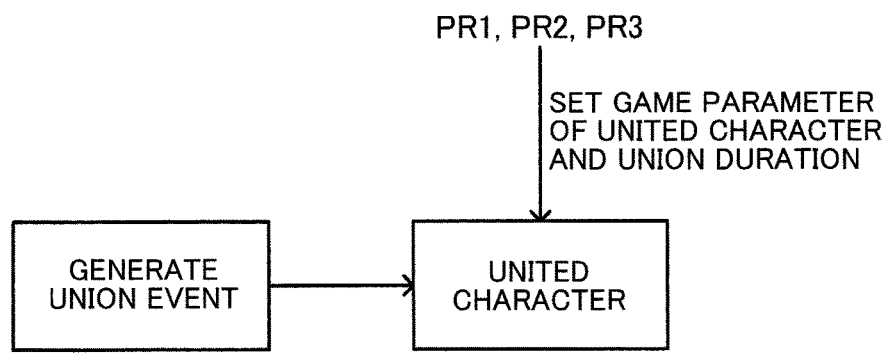
FIGS. 16A and 16B are views illustrating a process that sets game parameters of a united character and a special motion based on a relationship parameter.

As illustrated in FIG. 16A, when the union event (see FIGS. 7 and 8) has been generated, the game parameters (see FIG. 14C) of the united character CC and the union duration are set based on the relationship parameters PR1, PR2, and PR3. For example, the ability parameters (e.g., attack capability, defense capability, speed, and wisdom) of the united character CC are increased as the relationship parameters PR1, PR2, and PR3 increase. This makes it possible to increase the probability that the united character CC that has appeared to turn the tables defeats the enemy character.

Figure 16B:
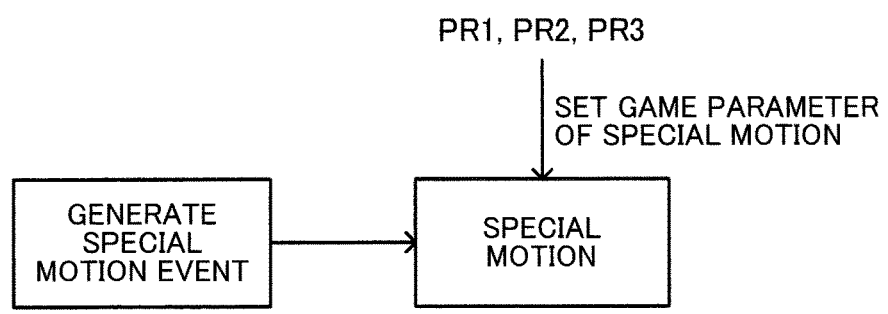

As illustrated in FIG. 16B, when the special motion event (e.g., implementation of a killer technique) (see FIG. 10) has been generated, the game parameters of the special motion are set based on the relationship parameters PR1, PR2, and PR3. For example, game parameters such as strength (attack power) and an effective range (attack range) have been set to a killer technique (i.e., special motion). The game parameters (e.g., strength and effective range) of the killer technique are increased as the relationship parameters PR1, PR2, and PR3 increase. Therefore, when the relationship parameters PR1, PR2, and PR3 have been set to a large value, it is possible to considerably damage a number of enemy characters situated over a wide range by implementing the killer technique.

Figure 17:
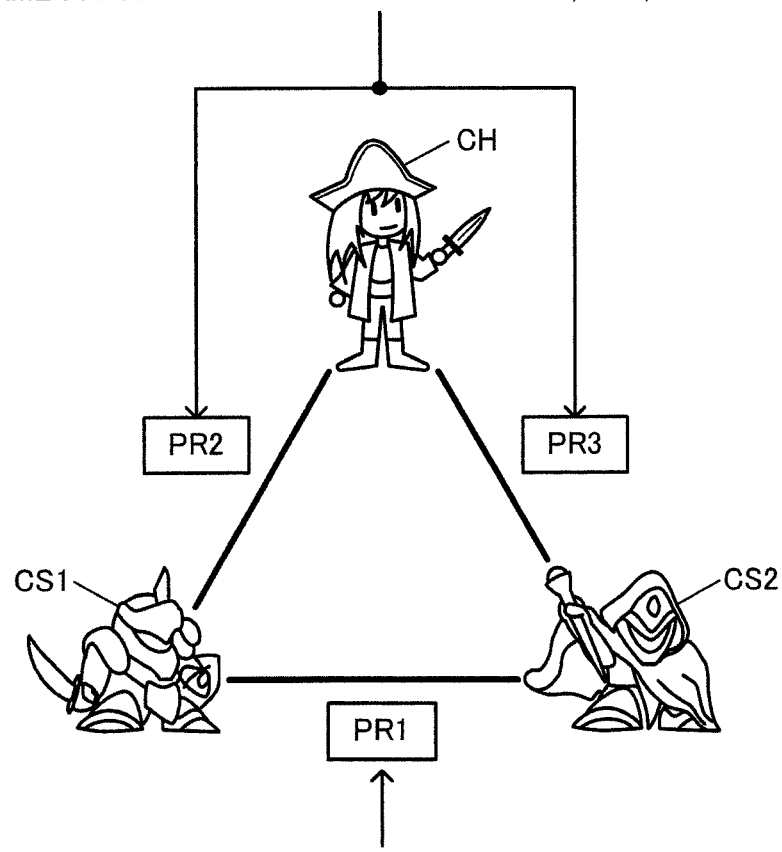
FIG. 17 is a view illustrating a process that changes a relationship parameter based on the details of a game process, elapsed time information, attribute information, charge information, and used item information.

FIG. 17 is a view illustrating the details of the relationship parameter setting process. As illustrated in FIG. 17, the relationship parameter PR2 between the master character CH and the subordinate character CS1 and the relationship parameter PR3 between the master character CH and the subordinate character CS2 are changed based on the details of the game process performed on the master character CH, the elapsed time information about the game, the attribute information about the master character CH and the subordinate characters CS1 and CS2, the charge information about the player, the used item information about the player, or the game parameters (consumption or change of the game parameters) of the master character CH and the subordinate characters CS1 and CS2. The relationship parameter PR1 between the subordinate characters CS1 and CS2 is changed based on the identical event participation information about the subordinate characters CS1 and CS2, the elapsed time information about the game, the attribute information about the subordinate characters CS1 and CS2, the charge information about the player, the used item information about the player, or the game parameters (consumption or change of the game parameters) of the master character CH and the subordinate characters CS1 and CS2.

The details of the game process performed on the master character CH refer to the details of the action performed by the master character CH on the subordinate characters CS1 and CS2 during the game, for example. For example, the details of the game process performed on the master character CH refer to the action of the master character CH when the master character CH takes the subordinate character CS1 for which the meal icon IC is displayed (see FIG. 11A) to the restaurant RS (see FIG. 11B). Alternatively, the details of the game process performed on the master character CH refer to the action of the master character CH when the master character CH performs an action (care) "PRAISE", "SCOLD", "GIVE A BREAK", or the like on the subordinate character CS1 (see D1 in FIG. 11A). When such an action has not been performed, the relationship parameters PR2 and PR3 gradually decrease with the passing of time (game time or real time). In this case, the relationship parameters PR2 and PR3 increase when the player has paid the amount charged, or used an item that increases the relationship parameters PR2 and PR3, for example. The relationship parameters PR2 and PR3 change depending on the relationship between the attribute ATA of the master character (see FIG. 14A) and the attribute ATB of the subordinate character (see FIG. 14B). For example, the relationship parameters PR2 and PR3 easily increase when it has been determined that the attribute ATA of the master character and the attribute ATB of the subordinate character have a good relationship (e.g., when the attribute ATA of the master character and the attribute ATB of the subordinate character are identical to each other), and do not easily increase when it has been determined that the attribute ATA of the master character and the attribute ATB of the subordinate character have a bad relationship.

The identical event participation information about the subordinate characters CS1 and CS2 refers to information that represents whether or not the subordinate characters CS1 and CS2 have participated in an event (e.g., training or mini-game) together, the situation information during the event in which the subordinate characters CS1 and CS2 participated, and the like (see FIGS. 12A to 13B). For example, when the subordinate characters CS1 and CS2 have participated in an identical event (e.g., training or mini-game), the relationship parameter PR1 between the subordinate characters CS1 and CS2 increases. The relationship parameter PR1 increases to a considerable extent when the subordinate characters CS1 and CS2 achieved good results in the event, or acquired bonus points or the like. When the subordinate characters CS1 and CS2 have not participated in an identical event, for example, the relationship parameter PR1 gradually decreases with the passing of time (game time or real time). In this case, the relationship parameter PR1 increases when the player has paid the amount charged, or used an item that increases the relationship parameter PR1, for example. The relationship parameter PR1 changes depending on the relationship between the attributes ATB of the subordinate characters (see FIG. 14B). For example, the relationship parameter PR1 easily increases when it has been determined that the attributes ATB of the subordinate characters have a good relationship (e.g., when the attributes ATB of the subordinate characters are identical to each other), and does not easily increase when it has been determined that the attributes ATB of the subordinate characters have a bad relationship.

For example, the relationship parameters PR1, PR2, and PR3 may be changed when the values of the game parameters of the subordinate characters CS1 and CS2 have been consumed (changed), or the values of the game parameters of the master character CH have been consumed (changed). For example, the relationship parameter PR1 is increased, or the relationship parameters PR2 and PR3 are increased when the points (e.g., hit points (strength value) and magic points (magical power value)) or the game parameter values (e.g., experience value, level value, and ability value) of the subordinate characters CS1 and CS2 have been consumed. Alternatively, the relationship parameters PR2 and PR3 are increased, or the relationship parameter PR1 is increased when the points (e.g., game points, trainer points, and in-game money) or the game parameter values (e.g., experience value, level value, and ability value) of the master character CH have been consumed. This makes it possible to improve the relationship between the master character CH and the subordinate characters CS1 and CS2 and the relationship between the subordinate characters CS1 and CS2 in return for consumption of the game parameter values.

2.5 Processing Example

A processing example according to one embodiment of the invention is described below using the flowcharts illustrated in FIGS. 18 and 19.

Figure 18:
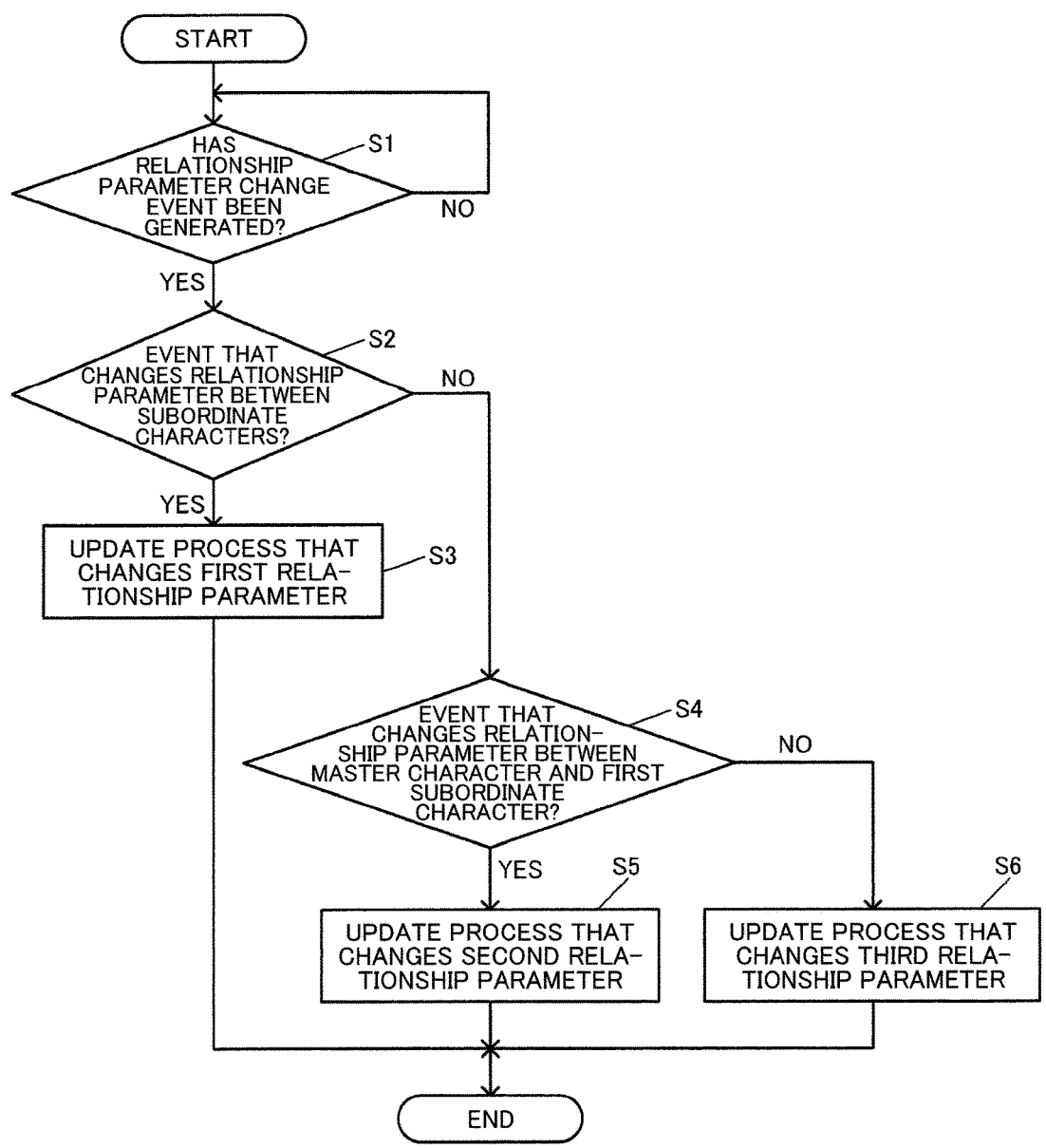
FIG. 18 is a flowchart illustrating a processing example according to one embodiment of the invention.

FIG. 18 is a flowchart illustrating the relationship parameter change process. Whether or not a relationship parameter change event has been generated is determined (step S1). When the relationship parameter change event has occurred, whether or not the relationship parameter change event is an event that changes the relationship parameter between the subordinate characters is determined (step S2). When the relationship parameter change event is an event that changes the relationship parameter between the subordinate characters, an update process that changes the first relationship parameter (PR1) between the subordinate characters is performed (step S3). When the relationship parameter change event is not an event that changes the relationship parameter between the subordinate characters, whether or not the relationship parameter change event is an event that changes the relationship parameter between the master character and the first subordinate character is determined (step S4). When the relationship parameter change event is an event that changes the relationship parameter between the master character and the first subordinate character, an update process that changes the second relationship parameter (PR2) is performed (step S5). When the relationship parameter change event is not an event that changes the relationship parameter between the master character and the first subordinate character, an update process that changes the third relationship parameter (PR3) is performed (step S6).

Figure 19:
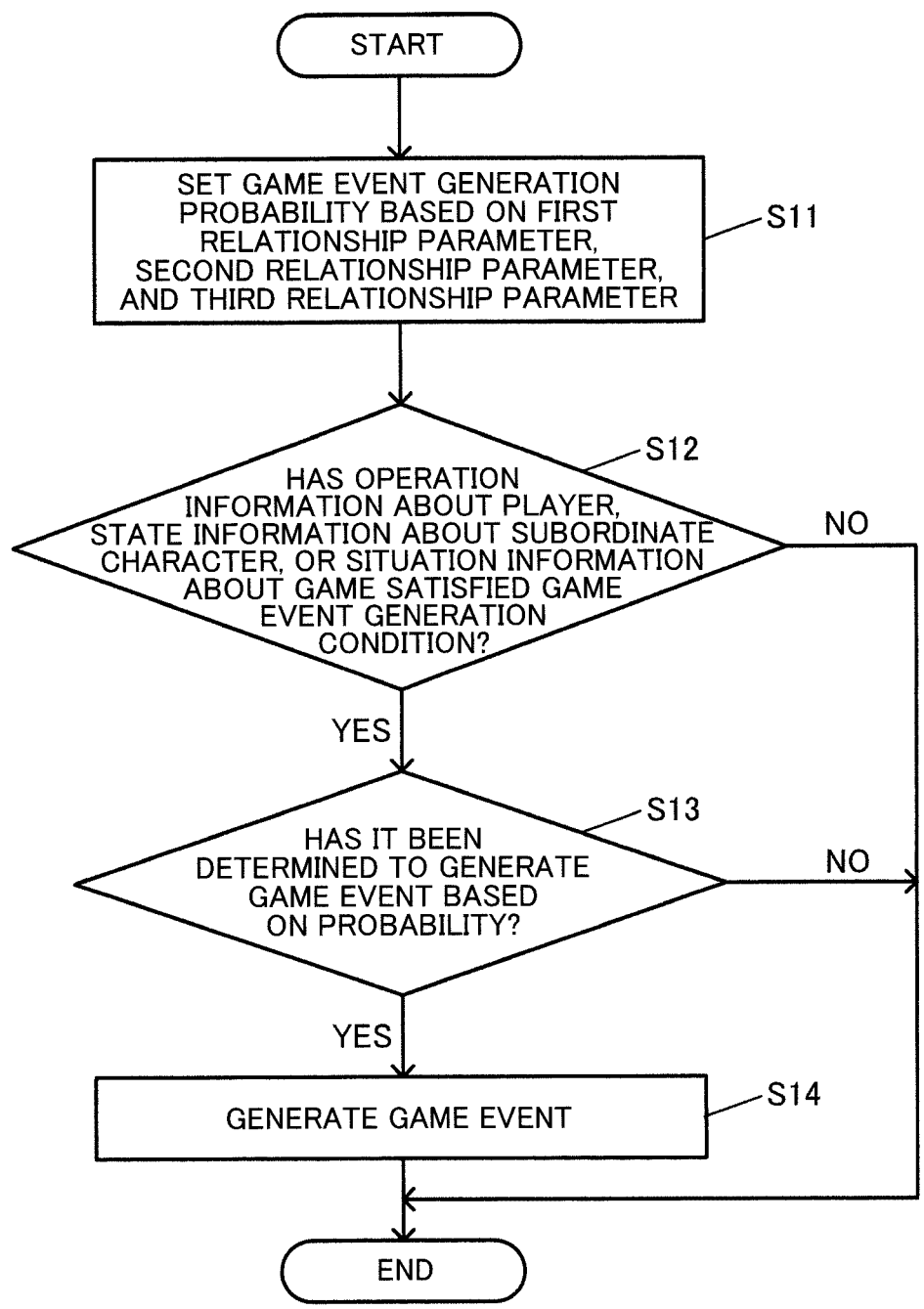
FIG. 19 is a flowchart illustrating a processing example according to one embodiment of the invention.

FIG. 19 is a flowchart illustrating the game event generation process. The game event generation probability is set based on the first relationship parameter (PR1), the second relationship parameter (PR2), and the third relationship parameter (PR3) (step S11). Specifically, the game event generation probability is set as described above with reference to FIG. 15B. Whether or not the operation information about the player, the state information about the subordinate character, or the situation information about the game has satisfied the game event generation condition is determined (step S12). For example, whether or not the game operation illustrated in FIG. 6 has been performed is determined, or whether or not the subordinate character has been set to the state illustrated in illustrated in FIG. 9 is determined. When the game event generation condition has been satisfied, whether or not to generate the game event is determined based on the probability set in the step S11 (step S13). When it has been determined to generate the game event, the game event (e.g., union event (see FIGS. 7 and 8) or special motion (see FIG. 10)) is generated (step S14).

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term (e.g., union event, special motion event, and killer technique) cited with a different term (e.g., game event and special motion) having a broader meaning or the same meaning at least once in the specification and the drawings can be replaced by the different term in any place in the specification and the drawings. The subordinate character/master character control process, the game process, the event process, the event generation process, the game parameter setting process, the first relationship parameter/second relationship parameter/third relationship parameter setting process, and the like are not limited to those described above in connection with the embodiments. Methods and processes equivalent to those described above in connection with the embodiments are intended to be included within the scope of the invention. The invention may be applied to various games. The invention may be applied to various game devices such as an arcade game device, a consumer game device, a large-scale attraction system in which a number of players participate, a simulator, a multimedia terminal, a system board that generates a game image, and a mobile phone. For example, the game device may be a mobile phone or a portable information terminal in which a game program is installed and executed.

What is claimed is:

1. A game device comprising:
a processor comprising hardware,
the processor being configured to implement:
a character process that performs a character control process;
a game process that performs a game parameter calculation process; and
a display process that displays a game image based on results of the game process, wherein
(i) animates a master character responsive to operation information inputted by a player, and (ii) controls a plurality of subordinate characters that are subordinate to the master character, wherein the subordinate characters are computer-controlled non-player characters, and wherein the subordinate characters include a first subordinate character and a second subordinate character, and
the game process performs a process regarding a game event, wherein the game event involves the first subordinate character and the second subordinate character, wherein the process regarding the game event is based on (i) a first relationship parameter between the first subordinate character and the second subordinate character, (ii) a second relationship parameter between the master character and the first subordinate character, and (iii) a third relationship parameter between the master character and the second subordinate character.

2. The game device as defined in claim 1,
wherein the processor implements the game process that performs the process regarding the game event based on the first relationship parameter, the second relationship parameter, the third relationship parameter, and at least one of operation information about the player, state information about the first subordinate character and the second subordinate character, and situation information about a game.

3. The game device as defined in claim 1,
wherein the processor implements the game process that sets generation probability information about the game event based on values of the first relationship parameter, the second relationship parameter, and the third relationship parameter.

4. The game device as defined in claim 1,
wherein the processor implements the game process that performs a determination process regarding generation of a union event, the union event being the game event in which the first subordinate character and the second subordinate character are united to form a united character.

5. The game device as defined in claim 4,
wherein the processor implements the game process that sets at least one of a game parameter of the united character and a union duration based on the first relationship parameter, the second relationship parameter, and the third relationship parameter.

6. The game device as defined in claim 1,
wherein the processor implements the game process that performs a determination process regarding generation of a special motion event, the special motion event being the game event in which the first subordinate character and the second subordinate character make a special motion.

7. The game device as defined in claim 6,
wherein the processor implements the game process that sets a game parameter of the special motion based on the first relationship parameter, the second relationship parameter, and the third relationship parameter.

8. The game device as defined in claim 1,
wherein the first subordinate character and the second subordinate character are computer-controlled non-player characters.

9. The game device as defined in claim 1,
wherein the processor implements the character process that controls the first subordinate character and the second subordinate character so as to act based on an instruction from the master character that is operated by the player.

10. The game device as defined in claim 1,
wherein the processor implements the game process that changes the second relationship parameter and the third relationship parameter based on at least one of details of the game process performed on the master character, elapsed time information about a game, attribute information about the master character, the first subordinate character, and the second subordinate character, charge information about the player, used item information about the player, and game parameters of the master character, the first subordinate character, and the second subordinate character.

11. The game device as defined in claim 1,
wherein the processor implements the game process that changes the first relationship parameter based on at least one of identical event participation information about the first subordinate character and the second subordinate character, elapsed time information about a game, attribute information about the first subordinate character and the second subordinate character, charge information about the player, used item information about the player, and game parameters of the master character, the first subordinate character, and the second subordinate character.

12. The game device as defined in claim 1, wherein the processor is further configured to implement:
an update process of the first relationship parameter to change a value of the first relationship parameter when an event that changes a relationship parameter between the first subordinate character and the second subordinate character is generated;
an update process of the second relationship parameter to change a value of the second relationship parameter when an event that changes a relationship parameter between the master character and the first subordinate character is generated;
an update process of the third relationship parameter to change a value of the third relationship parameter when an event that changes a relationship parameter between the master character and the second subordinate character is generated; and
a determination process on whether to generate the game event based on the values of the first relationship parameter, the second relationship parameter, and the third relationship parameter which change by the update processes, and the game process generates the game event.

13. The game device as defined in claim 1, wherein the game process performs a process to decrease values of the first relationship parameter, the second relationship parameter, and the third relationship parameter with passing of time.

14. The game device as defined in claim 1, further comprising:
an operation device; and
a display section, wherein
the operation information is inputted via the operation device, and
the display process displays the game image on the display section.

15. A processing method comprising:
performing a character process that performs a character control process;
performing a game process that performs a game parameter calculation process;
performing a display process that displays a game image based on results of the game process;
performing the character process that (i) animates master character responsive to operation information inputted by a player, and (ii) controls a plurality of subordinate characters that are subordinate to the master character, wherein the subordinate characters are computer-controlled non-player characters, and wherein the subordinate characters include a first subordinate character and a second subordinate character; and
performing the game process that performs a process regarding a game event, wherein the game event involves the first subordinate character and the second subordinate character, wherein the process regarding the game event is based on (i) a first relationship parameter between the first subordinate character and the second subordinate character, (ii) a second relationship parameter between the master character and the first subordinate character, and (iii) a third relationship parameter between the master character and the second subordinate character.

16. The processing method as defined in claim 15,
wherein the processor is further configured to implement:
an update process of the first relationship parameter to change a value of the first relationship parameter when an event that changes a relationship parameter between the first subordinate character and the second subordinate character is generated;
an update process of the second relationship parameter to change a value of the second relationship parameter when an event that changes a relationship parameter between the master character and the first subordinate character is generated;

an update process of the third relationship parameter to change a value of the third relationship parameter when an event that changes a relationship parameter between the master character and the second subordinate character is generated; and a determination process on whether to generate the game event based on the values of the first relationship parameter, the second relationship parameter, and the third relationship parameter which change by the update processes, and the game process generates the game event.

17. The processing method as defined in claim 15, further comprising, by the game process, performing a process to decrease values of the first relationship parameter, the second relationship parameter, and the third relationship parameter with passing of time.

18. A non-transitory computer-readable information storage medium storing a program that causes a computer to execute a processing method, the program causing the computer to perform a character process that performs a character control process;

perform a game process that performs a game parameter calculation process;

perform a display process that displays a game image based on results of the game process;

perform the character process that (i) animates a master character responsive to operation information inputted by a player, and (ii) controls a plurality of subordinate characters that are subordinate to the master character, wherein the subordinate characters are computer-controlled non-player characters, and wherein the subordinate characters include a first subordinate character and a second subordinate character; and perform the game process that performs a process regarding a game event, wherein the game event involves the first subordinate character and the second subordinate character, wherein the process regarding the game event is based on (i) a first relationship parameter between the first subordinate character and the second subordinate character, (ii) a second relationship parameter between the master character and the first subordinate character, and (iii) a third relationship parameter between the master character and the second subordinate character.

19. The non-transitory computer-readable information storage medium as defined in claim 18, wherein the program further causes the computer to implement:

an update process of the first relationship parameter to change a value of the first relationship parameter when an event that changes a relationship parameter between the first subordinate character and the second subordinate character is generated;

an update process of the second relationship parameter to change a value of the second relationship parameter when an event that changes a relationship parameter between the master character and the first subordinate character is generated;

an update process of the third relationship parameter to change a value of the third relationship parameter when an event that changes a relationship parameter between the master character and the second subordinate character is generated; and a determination process on whether to generate the game event based on the values of the first relationship parameter, the second relationship parameter, and the third relationship parameter which change by the update processes, and the game process generates the game event.

20. The non-transitory computer-readable information storage medium as defined in claim 18, wherein the program further causes the computer to implement a process to decrease values of the first relationship parameter, the second relationship parameter, and the third relationship parameter with passing of time.

* * * * *